United States Patent
Hasegawa et al.

(10) Patent No.: US 7,065,009 B1
(45) Date of Patent: *Jun. 20, 2006

(54) OPTICAL INFORMATION STORAGE APPARATUS AND OPTICAL DEVICE INCLUDING A BEAM SPLITTING SURFACE WITH A CONVEX SURFACE SIDE AND A CONCAVE SURFACE SIDE

(75) Inventors: Shinya Hasegawa, Kawasaki (JP); Nobuhide Aoyama, Kawasaki (JP); Wataru Odajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/564,285

(22) Filed: May 4, 2000

(30) Foreign Application Priority Data

May 14, 1999 (JP) ................................. 11-134510
Dec. 13, 1999 (JP) ................................. 11-353048

(51) Int. Cl.
*G11B 7/00* (2006.01)
(52) U.S. Cl. ............................... 369/44.23; 369/112.15; 369/112.23
(58) Field of Classification Search ............ 369/44.11, 369/112.12, 112.15, 112.19, 112.23–112.24, 369/103, 44.1, 44.23; G11B 7/00
See application file for complete search history.

(56) References Cited

U.S. PATENT DOCUMENTS

| | | | | |
|---|---|---|---|---|
| 4,716,283 A | * | 12/1987 | Ando | 369/44.23 |
| 4,783,589 A | * | 11/1988 | Ando | |
| 5,293,372 A | | 3/1994 | Hoshino et al. | |
| 5,448,407 A | | 9/1995 | Tzeng et al. | 359/638 |
| 5,608,708 A | * | 3/1997 | Ophey | 369/112.14 |
| 5,627,806 A | | 5/1997 | Kobayashi | 369/44 |
| 5,708,644 A | * | 1/1998 | Hasegawa | 369/44.12 |
| 5,719,845 A | | 2/1998 | Ando | |
| 5,790,504 A | * | 8/1998 | Hayashi et al. | 369/112.12 |
| 6,084,841 A | * | 7/2000 | Sugiura et al. | 369/112.21 |
| 6,108,283 A | * | 8/2000 | Fujita et al. | 369/44.23 |
| 6,154,434 A | * | 11/2000 | Shibano et al. | 369/112.15 |
| 6,249,493 B1 | * | 6/2001 | Dang | 369/44.23 |
| 6,560,189 B1 | * | 5/2003 | Aoyama et al. | 369/112.29 |
| 6,819,637 B1 | * | 11/2004 | Hasegawa et al. | 369/44.23 |

FOREIGN PATENT DOCUMENTS

| | | |
|---|---|---|
| JP | 59008145 | 1/1984 |
| JP | 61271630 | 12/1986 |
| JP | 61278821 | 12/1986 |
| JP | 4159625 | 6/1992 |
| JP | 04-295648 | 10/1992 |
| JP | 05-109109 | 4/1993 |
| JP | 636379 | 2/1994 |
| JP | 676407 | 3/1994 |
| JP | 06-168462 | 6/1994 |
| JP | 07-153107 | 6/1995 |

(Continued)

*Primary Examiner*—Aristotelis M. Psitos
(74) *Attorney, Agent, or Firm*—Greer, Burns & Crain, Ltd.

(57) ABSTRACT

There is disclosed a small lightweight optical information storage apparatus which can obtain a sufficient writing light quantity, and an optical device which can realize the optical information storage apparatus. The optical device for use in the optical information storage apparatus has a splitting surface constituted of a part of a cylindrical surface. A light emitted from a light source is passed via the optical device and directed to an optical information storage medium, and a signal light is split from a return light from the optical information storage medium by the optical device.

20 Claims, 20 Drawing Sheets

FOREIGN PATENT DOCUMENTS

| | | |
|---|---|---|
| JP | 07/161060 | 6/1995 |
| JP | 07-176096 | 7/1995 |
| JP | 07-311989 | 11/1995 |
| JP | 07-320327 | 12/1995 |
| JP | 08-329544 | 12/1996 |
| JP | 09-080211 | 3/1997 |
| JP | 10214433 | 8/1998 |
| WO | WO 91/12609 | * 8/1991 |
| WO | 9916061 | 4/1999 |

* cited by examiner

Fig. 21
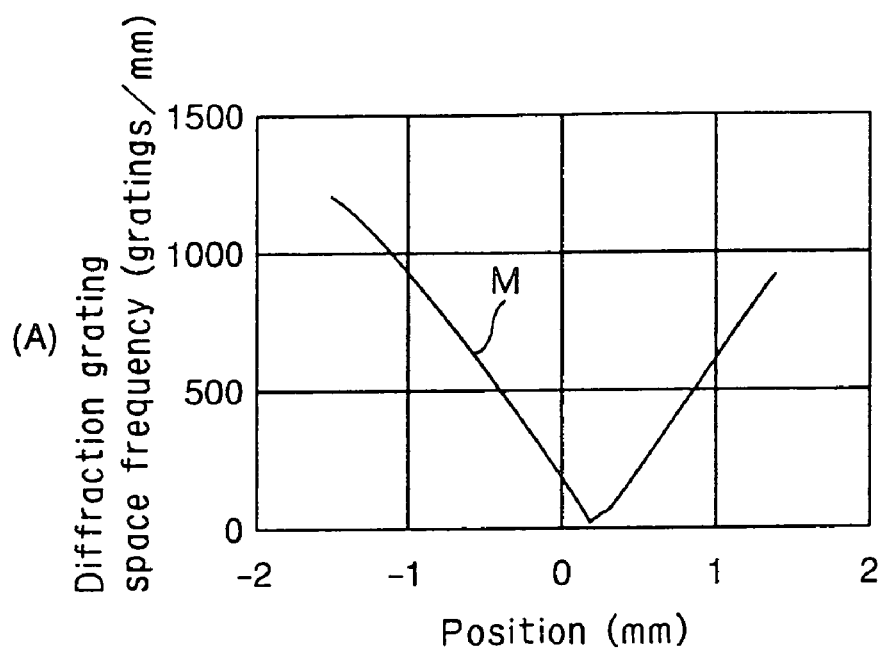
(A)
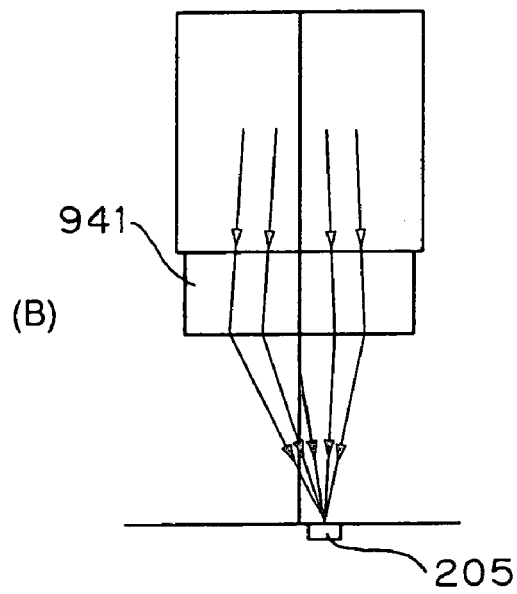
(B)

OPTICAL INFORMATION STORAGE APPARATUS AND OPTICAL DEVICE INCLUDING A BEAM SPLITTING SURFACE WITH A CONVEX SURFACE SIDE AND A CONCAVE SURFACE SIDE

BACKGROUND OF THE INVENTION (i) Field of the Invention

The present invention relates to an optical information storage apparatus which irradiates an optical information storage medium with light to access the optical information storage medium, and to an optical device for use in the optical information storage apparatus.

(ii) Description of the Related Art

With enhancement of a computer performance in recent years, a large-capacity storage apparatus for a computer has been demanded, and a hard disk apparatus has been noted as a candidate for the storage apparatus, and an optical information storage apparatus represented by a magnetic optical disk apparatus using a magnetic optical disk as an optical information storage medium has also been noted. Particularly, the optical information storage apparatus is regarded as most important because the optical information storage medium is provided with characteristics such as replaceability, large capacity, and small size and light weight.

In order to turn the optical information storage apparatus to practical use as a computer storage apparatus, and the like, the price reduction of the apparatus is necessary, and particularly the price reduction of an optical head for irradiating the optical information storage medium with light among the elements of the optical information storage apparatus has strongly be demanded. Moreover, as a countermeasure for the price reduction of the optical head, it is proposed that the reduction in size and weight of the optical head and the reduction of the number of adjustment processes should be realized by decreasing the number of optical head components.

However, in the conventional proposals for a component number decreasing system, there are problems that the optical head and optical information storage apparatus cannot sufficiently be miniaturized or lightened, and that the quantity of light to be radiated to the optical information storage medium decreases and the light quantity falls short during writing.

SUMMARY OF THE INVENTION

In view of the above-described situations, an object of the present invention is to provide a small lightweight optical information storage apparatus in which a sufficient writing light quantity can be obtained, and an optical device which can realize the optical information storage apparatus.

To attain the above-described object, according to the present invention, there is provided an optical information storage apparatus comprising:

a light source for emitting a divergent light;

an objective optical system for focusing the light emitted from the light source upon an optical information storage medium to generate a return light at least partially including a signal light corresponding to stored information, and for converting the return light from the optical information storage medium to a convergent light and directing the light toward the light source; and an optical device, positioned between the light source and the objective optical system, for passing and guiding the light emitted from the light source to the objective optical system, and for splitting the signal light from the return light reflected by the optical information storage medium and returned via the objective optical system.

The optical device includes a splitting surface formed of a part of a cylindrical surface, passes and guides the light emitted from the light source via a concave surface side of the splitting surface to the objective optical system, and splits the signal light from the return light incident upon a convex surface side of the splitting surface by the splitting surface.

Here, to "pass" the light via the splitting surface means both to transmit the light through the splitting surface and to reflect the light by the splitting surface.

According to the optical information storage apparatus of the present invention, the emitted light as the divergent light is passed and guided to the objective optical system via the concave surface side of the splitting surface constituted of a part of the cylindrical surface, and the return light as the convergent light is incident upon the convex surface side of the splitting surface and split from the signal light by the splitting surface.

The splitting surface constituted of a part of the cylindrical surface can be designed so that the emitted light as the divergent light and the return light as the convergent light are incident at a substantially constant incident angle over the entire luminous flux. As a result, the passing of the emitted light and the splitting of the signal light are efficiently performed, and a sufficient light quantity can be obtained during writing.

Moreover, for the optical device including the splitting surface, even when the device is disposed in the vicinity of the light source for emitting the divergent light, the function can be guaranteed, the device can be realized as a small-size device for a small diameter luminous flux, and as a result, a small lightweight optical information storage apparatus can be realized.

In the optical information storage apparatus of the present invention, it is preferable that, the optical information storage medium generates the return light at least partially including the signal light polarized in a predetermined polarization direction, and the optical device has, as the above-described splitting surface, a surface which has a relatively high reflectance with respect to the light polarized in the predetermined polarization direction, and has a relatively low reflectance with respect to the light polarized in the polarization direction crossing at right angles to the predetermined polarization direction.

The optical device of the optical information storage apparatus including the preferable constitution has a function as a so-called polarized beam splitter, and can efficiently split the signal light included in the return light.

Moreover, in the optical information storage apparatus of the present invention, the optical device preferably has, as the splitting surface, a surface which can split the signal light from the return light incident at an incidence angle of 45°.

A multilayered film, and other techniques of splitting the signal light from the return light incident at the incidence angle of 45° have heretofore been known. By applying this technique to the formation of the splitting surface, a high-performance optical device can be formed at a low cost, and the optical information storage apparatus can be provided at a low price.

Moreover, in the optical information storage apparatus of the present invention, the above-described objective optical system preferably includes a collimating lens for converting the emitted light from the light source to a parallel light, and an objective lens for focusing the parallel light upon the optical information storage medium.

Since a distance between the collimating lens and the objective lens can arbitrarily be changed, the design and adjustment of the optical information storage apparatus are facilitated, and the optical information storage apparatus can be realized at the low price.

Moreover, it is preferable that, the optical information storage apparatus of the present invention further comprises: a signal detector for detecting the signal light; and a servo detector for detecting the position of an irradiation light with respect to the optical information storage medium, and in the optical information storage apparatus the signal light split from the return light by the splitting surface is guided by the signal detector, and the return light transmitted through the splitting surface is guided by the servo detector.

According to the optical information storage apparatus preferably constituted as described above, since the return light split from the signal light is guided to the servo detector, the return light is utilized with no waste.

Furthermore, in the optical information storage apparatus of the present invention, the optical device preferably includes a birefringence part for further splitting the signal light split by the splitting surface into a normal beam and an abnormal beam.

When the birefringence part is incorporated in the optical device, a small lightweight optical information storage apparatus which can detect the signal light by the magnetic optical disk is realized, and the optical system of the optical information storage apparatus has a high stability.

When the optical information storage apparatus of the present invention is provided with the optical device including the birefringence part, it is preferable that, the optical information storage apparatus is provided with the signal detector constituted of two optical detectors, and the optical device includes a reflecting surface formed of a part of the cylindrical surface, reflects the signal light split by the splitting surface on the concave surface side of the reflecting surface to converge the signal light, and further splits the signal light converged by the reflecting surface into the ordinary beam and the extraordinary beam by the birefringence part for differential outputs of the two optical detectors.

According to the optical information storage apparatus preferably constituted as described above, two beams for detecting MO signal are clearly split.

When the optical information storage apparatus of the present invention is provided with the optical device including the birefringence part, the optical device preferably further includes a focus part for focusing the ordinary beam and the extraordinary beam (two beams for detecting the MO signal) split by the birefringence part upon positions which are different from each other.

In the optical information storage apparatus preferably constituted as described above, since not only the birefringence part but also the focusing part are incorporated in the optical device, a smaller optical information storage apparatus is realized, and the safety of the optical system is further enhanced.

It is preferable that, the optical information storage apparatus of the present invention further comprises an emitted light quantity controlling detector for detecting a light for controlling the emitted light quantity of the light source, and the optical information storage apparatus transmits and guides the emitted light from the light source via the concave surface side of the splitting surface to the objective optical system, and the optical device includes a convergence part for allowing the light reflected on the concave surface side of the splitting surface in the emitted light from the light source to converge in a generating line of the splitting surface and for transmitting the light into the emitted light quantity controlling detector.

According to the optical information storage apparatus provided with the optical device including the convergence part, even when the attachment position of the optical device slightly deviates in a direction crossing at right angles to the generating line of the splitting surface relatively with respect to the emitted light quantity controlling detector, the incidence position of the light incident upon the emitted light quantity controlling detector remains in substantially the same position. Therefore, the light receiving surface of the emitted light quantity controlling detector can be miniaturized, and as a result, the quantity of light emitted from the light source can appropriately be controlled. Moreover, the attaching and positioning of the optical device are facilitated.

When the optical information storage apparatus is provided with the above-described emitted light quantity controlling detector, the emitted light quantity controlling detector preferably includes the light receiving surface longitudinal in the direction crossing at right angles to the generating line of the splitting surface.

The area of the light receiving surface can sufficiently be reduced, and as a result, the influence of stray light can sufficiently be reduced and the response rate of the emitted light quantity controlling detector can sufficiently be enhanced.

Moreover, when the optical information storage apparatus is provided with the above-described convergence part, the convergence part of the optical device is preferably disposed so that a main axis deviates from the main beam of the light reflected on the concave surface side of the splitting surface.

When the main beam of the light reflected by the splitting surface is aligned with the main axis of the convergence part, for the light incident upon the emitted light quantity controlling detector, the light reflected by the light receiving surface of the emitted light quantity controlling detector returns to the splitting surface, thereby causing a disadvantage by the incidence upon the other detectors and the light source. On the other hand, when the main axis of the convergence part deviates from the main beam of the light reflected by the splitting surface, the disadvantage can be avoided.

To attain the above-described object, according to the present invention, there is provided an optical device which is disposed between an objective optical system for focusing a light emitted from a light source for emitting a divergent light upon an optical information storage medium to generate a return light at least partially including a signal light corresponding to stored information and for converting the return light from the optical information storage medium into a convergent light and directing the light toward the light source, and the light source, and which passes and guides the emitted light from the light source to the objective optical system, and splits the signal light from the return light reflected by the optical information storage medium and returned via the objective optical system. The optical device includes a splitting surface constituted of a part of a cylindrical surface, passes and guides the emitted light from the light source to the objective optical system via the concave surface side of the splitting surface, and splits the signal light from the return light incident on the convex surface side of the splitting surface by the splitting surface.

It is preferable that, the optical device of the present invention further includes: a reflecting surface formed of a part of the cylindrical surface; and a birefringence part for further splitting the signal light split by the splitting surface to an ordinary beam and an extraordinary beam, and the optical device reflects the signal light split by the splitting surface on the concave surface side of the reflecting surface to converge the signal light, and further splits the signal light converged by the reflecting surface into the ordinary beam and the extraordinary beam by the birefringence part for the differential outputs of two optical detectors.

Moreover, it is preferable that, the optical device of the present invention passes and guides the emitted light from the light source to the objective optical system via the concave surface side of the splitting surface, and the optical device includes a convergence part for allowing the light reflected on the concave surface side of the splitting surface in the emitted light from the light source to converge in the generating line of the splitting surface and transmitting the light into the emitted light quantity controlling detector for detecting a light for controlling the emitted light quantity of the light source.

As described above, the optical information storage apparatus of the present invention can obtain a sufficient writing light quantity and can be realized as a small lightweight apparatus. Moreover, by using the optical device of the present invention, the optical information storage apparatus can be realized.

BRIEF DESCRIPTION OF THE DRAWINGS

FIG. 21 is a diagram showing the design example of a diffraction grating device (HOE) having focus characteristics similar to those of the cylindrical lens.

DETAILED DESCRIPTION OF THE PREFERRED EMBODIMENTS

Embodiments of the present invention will be described hereinafter, but the principles of a comparative example and the present invention will first be described, and the concrete embodiments of the present invention will then be described.

Figure 1:
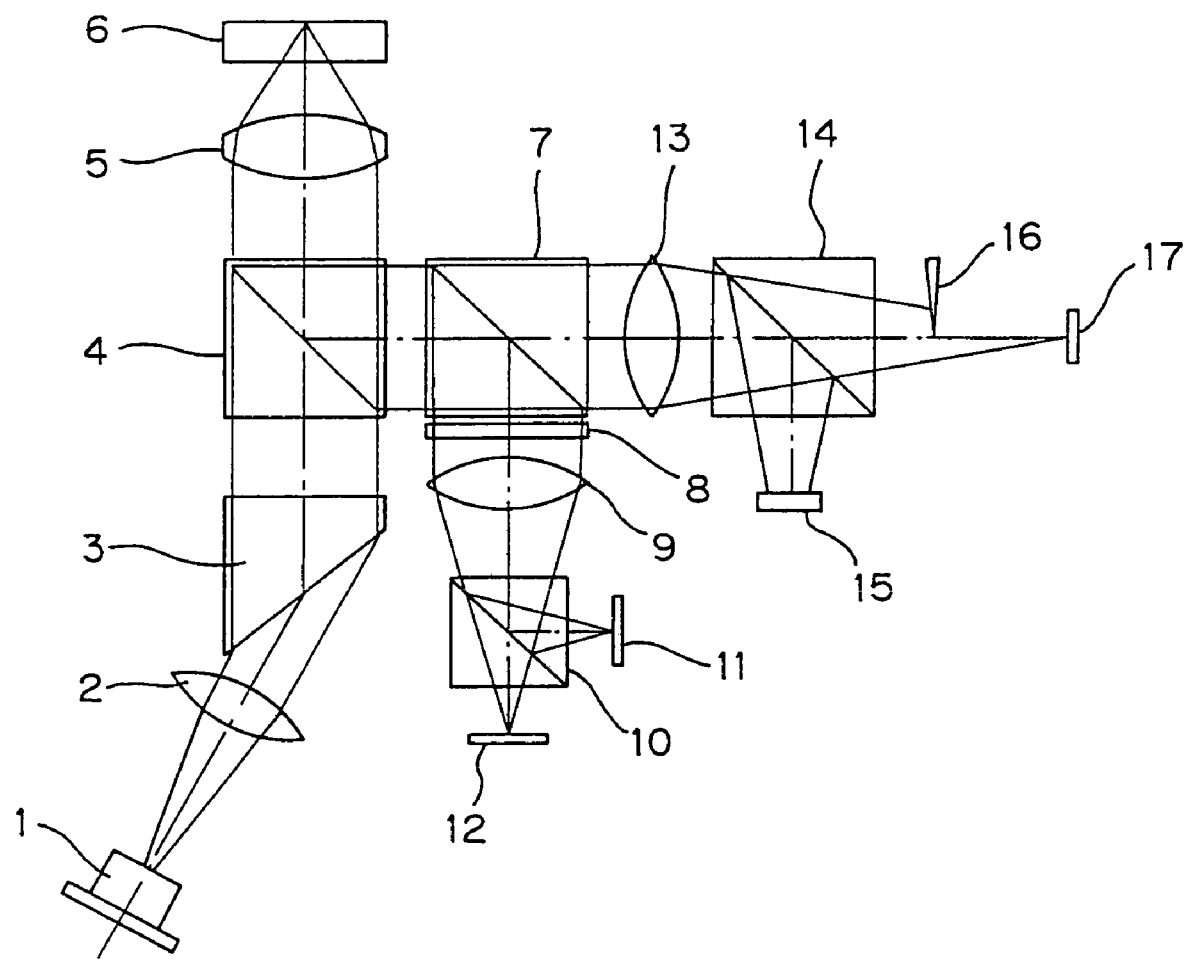
FIG. 1 is a diagram showing a first comparative example of an optical head.

FIG. 1 is a diagram showing a first comparative example of an optical head.

An optical information storage medium 6 irradiated with light by the optical head is a magnetic optical disk (MO disk).

The optical head is provided with a laser diode 1 as a light source, and the laser diode 1 emits a polarized divergent light as a luminous flux having an elliptic section. The divergent light emitted from the laser diode 1 is converted to a parallel light in a collimating lens 2, and the luminous flux is shaped by a beam shaping prism 3 to form a circular section.

The shaped parallel luminous flux is incident upon a first polarized beam splitter 4, transmitted through a splitting surface, focused upon the optical information storage medium 6 by an objective lens 5 and radiated. During information writing, in the position of an irradiation light on the optical information storage medium 6, an upward or downward magnetic pole is formed by the heat of the irradiation light and an external magnetic field generated by a magnetic head (not shown), and the magnetic pole has an on state or an off state in accordance with written information. Thereby, the information is stored in an on/off data form. On the other hand, during information reading, the magnetic pole is irradiated with the irradiation light, and a reflected light (return light) is generated by rotating the polarization direction of the irradiation light in a direction suitable for a magnetic pole direction only by a micro angle by a Kerr effect.

The light (return light) reflected by the optical information storage medium 6 is returned to the first polarized beam splitter 4 via the objective lens 5 and reflected by the splitting surface. The reflected light is further reflected by the splitting surface of a second polarized beam splitter 7, the polarization direction is rotated by 45° by a λ/2 plate 8, and the light is focused upon a first focus lens 9. Thereafter, a third polarized beam splitter 10 splits the light to the projective component of the sum component of the angle at which the polarization direction is rotated by Kerr effect and 45°, and the component crossing at right angles to the projective component, the respective split components are detected by two photodetectors 11, 12, respectively, and a differential signal is obtained as the difference in intensity of the respective components. Thereby, the on/off signal (MO signal) responding to on/off data stored in the optical information storage medium 6 is detected.

A part of the light reflected by the first polarized beam splitter 4 is transmitted through the splitting surface of the second polarized beam splitter 7, and converges into a second focus lens 13. Subsequently, the converged light is split into two by a beam splitter 14, one of the two split lights is reflected by the beam splitter 14, and the other is transmitted through the beam splitter 14. The light reflected by the beam splitter 14 is used for tracking detection by a photodetector 15, and the light transmitted through the beam splitter 14 is used for focus detection by a knife edge 16 and a photodetector 17. The results of the tracking detection and focus detection are fed back to an actuator (not shown) for adjusting the position of the objective lens 5, and the position of the objective lens 5 is adjusted.

The first comparative example requires a number of optical devices in this manner. Therefore, problems arise that the number of formation and adjustment processes is large, thereby increasing the manufacture cost, the safety of the optical system is deteriorated, and that the size of the optical head and optical information storage apparatus is large.

A second comparative example provides the optical head which can solve some of the problems of the first comparative example.

Figure 2:
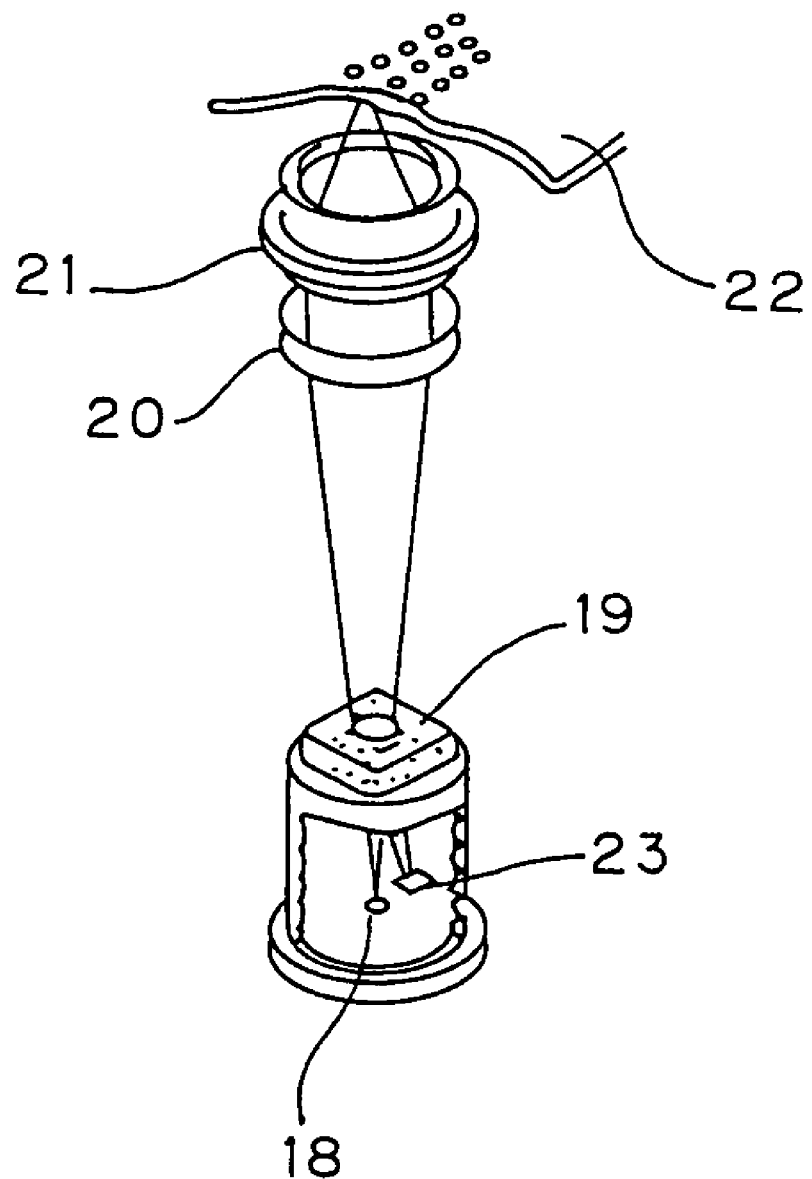
FIG. 2 is a diagram showing a second comparative example of the optical head.

FIG. 2 is a view showing the second comparative example of the optical head.

The second comparative example is provided with a laser diode 18 as the light source which emits a divergent light, and a holographic optical element (hereinafter referred to as HOE) 19 which serves as the beam splitter 14 and the second focus lens 13 shown in FIG. 1. The laser light emitted from the laser diode 18 is transmitted through the HOE 19, and focused/radiated upon an optical information storage medium 22 via a collimator 20 and an objective lens 21. The reflected light (return light) by the optical information storage medium 22 returns to the HOE 19 via the objective lens 21 and the collimator 20, and a part of the reflected light (return light) is split/focused by the HOE 19, and used for the tracking detection and focus detection by a photodiode 23.

In this second comparative example, since one HOE 19 fulfills the roles of a plurality of optical devices in the first comparative example, the number of optical devices is reduced, and the optical system is stabilized. Moreover, since the HOE 19 is disposed in the vicinity of the laser diode 18, the laser luminous flux is thin, and the optical system size is small.

However, the HOE 19 cannot fulfill a function of splitting the light in accordance with the polarization, and when the optical information storage medium 22 is a magnetic optical disk, the optical system as shown in FIG. 2 needs to further incorporate three polarized beam splitters 4, 7, 10, λ/2 plate 8, and other components shown in FIG. 1. Supposing that the polarized beam splitter, or the like is incorporated between the collimator 20 and the objective lens 21 shown in FIG. 2 in a similar manner as FIG. 1, a problem arises that the size of the optical device is enlarged in a similar manner as FIG. 1.

Moreover, supposing that the polarized beam splitter, or the like is incorporated between the HOE 19 and the collimator 20 shown in FIG. 2, the divergent light is incident upon the polarized beam splitter because the laser beam is a divergent light. However, the splitting surface of the polarized beam splitter is formed by a dielectric multilayered film in many cases, and the characteristic of the reflectance and transmittance of the polarized beam splitter depend largely on the light incidence angle. For the splitting surface formed by the dielectric multilayered film, for example, when the light with a wavelength of 685 nm is incident at a designed incidence angle 45°, 85% of the light having a predetermined P-polarization direction is transmitted, 95% or more of the light having a S-polarization direction crossing at right angles to the P-polarization direction is reflected at a reflectance of 95% or more, and a phase difference made by the difference of the polarization directions is within 5° in the characteristics. However, when the incidence angle deviates from the designed incidence angle by ±4°, the transmittance of the light of polarization direction to be transmitted is deteriorated as much as about 20%. Moreover, when the optical information storage medium is a magnetic optical disk, the phase difference with the polarization direction difference needs to be sufficiently small. However, when the incidence angle deviates from the designed angle by about 5°, the phase difference rapidly increases, for example, to 20° or more, and as a result, a CN (carrier noise) ratio is deteriorated, and information regeneration cannot be performed.

Therefore, in order to guarantee the characteristics of the polarized beam splitter, it is proposed to throttle a divergent luminous flux so that an opening obtains, for example, NA of about 0.05, but when the luminous flux is throttled in this manner, the light quantity is remarkably reduced, thereby causing a problem that the light quantity falls short during the writing of information to a high-rate large-capacity optical disk, and the like.

In view of the above-described problems of the comparative examples, the principle of the present invention will be described hereinafter.

Figure 3:
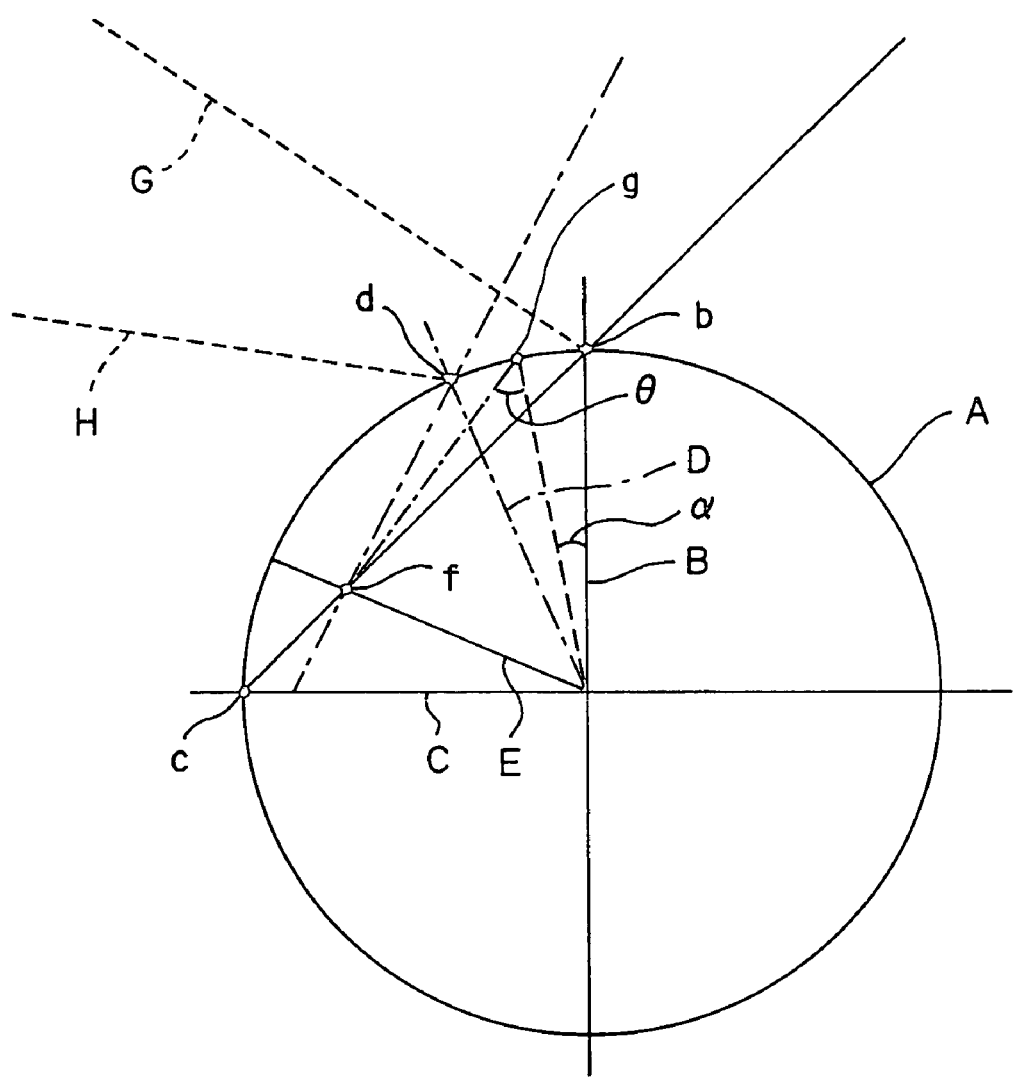
FIG. 3 is an explanatory view of the principle of the present invention.

FIG. 3 is an explanatory view of the principle of the present invention.

FIG. 3 shows a circle A representing a cylindrical surface, two diameters B, C crossing at right angles to each other and intersections b, c of the two diameters B, C with the circle A. Moreover, radii D, E forming an angle of 22.5° to the respective diameters B, C are also shown.

Suppose that the light source is present in the intersection f of the radius E and a chord bc, and straight lines fb and fd represent the outer shape of the divergent luminous flux. In this case, since the divergent angle of the divergent luminous flux is 17.8°, with the incidence of the divergent luminous flux upon a plane, an incidence angle distribution of 17.8° is generated. On the other hand, in view of the incidence angle distribution with the incidence of the divergent luminous flux onto the cylindrical surface A, the straight line fb forms an angle of 45° to the diameter B. When the arbitrary point, on the circle A, of the luminous flux from the light source f is g, an angle from this radius B is α, and the angle of the light source f from the normal line on the point g is θ, the following equation results:

$$\theta = \tan^{-1}\{0.7653 \sin(112.5°+\alpha)/(1+0.7653 \cos(112.5°+\alpha))\},$$

in which the incidence angle θ monotonously increases as the point g goes to the point d from the point b. Since the angle formed by the straight line fd and the radius D is 49.7°, the incidence angle distribution is 4.7°. Specifically, as compared with the incidence of the divergent light upon the plane, the incidence of the divergent light upon the cylindrical surface A is remarkably small in the incidence angle distribution. Moreover, the divergent light also spreads in the depth direction of FIG. 3, but as shown later by a graph, the incidence angle distribution is hardly generated in the spread of the depth direction of FIG. 3. Therefore, by using the polarized beam splitter including the splitting surface formed by a part of the cylindrical surface A, the incidence angle distribution of the divergent light is considerably suppressed. Additionally, two dotted lines G, H in FIG. 3 show the luminous flux when the light returning in the direction to the light source is reflected by the cylindrical surface A.

In FIG. 3, a simple arrangement example has been described for the sake of simplicity, but by adjusting the position of the light source and the direction of the light, the incidence angle distribution can further be suppressed. Moreover, FIG. 3 is a diagram showing the transmission of the divergent light incident upon the cylindrical surface A, but even when the divergent light is reflected by the cylindrical surface A, the incidence angle distribution can be suppressed in the same manner as described above.

Figure 4:
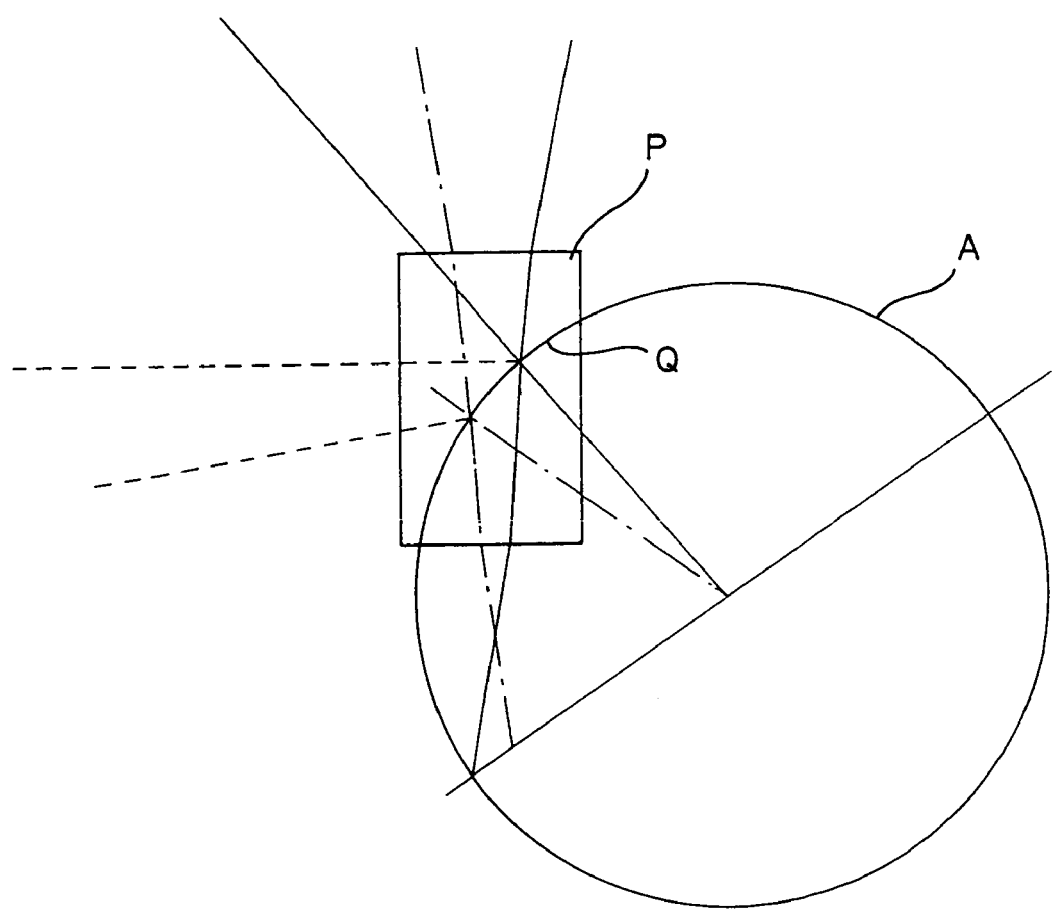
FIG. 4 is a diagram showing a design example in which the outer shape of a polarized beam splitter is also taken into consideration.

FIG. 4 is a diagram showing a design example in which the outer shape of the polarized beam splitter is also taken into consideration.

FIG. 4 shows not only the circle A representing the cylindrical surface but also a rectangle P representing the outer shape of the polarized beam splitter, and shows that when the divergent light is incident upon the polarized beam splitter P, the light is refracted and the divergent angle of the divergent light is reduced. The splitting surface Q of the polarized beam splitter P is designed by also including the refraction.

The incidence angle distribution in the cylindrical surface type polarized beam splitter including the optimum designed splitting surface will be compared hereinafter with the incidence angle distribution in a plane type polarized beam splitter.

FIG. 5A is a graph showing the incidence angle distribution in the plane type polarized beam splitter, and FIG. 5B is a graph showing the incidence angle distribution in the cylindrical surface type polarized beam splitter.

Figure 5:
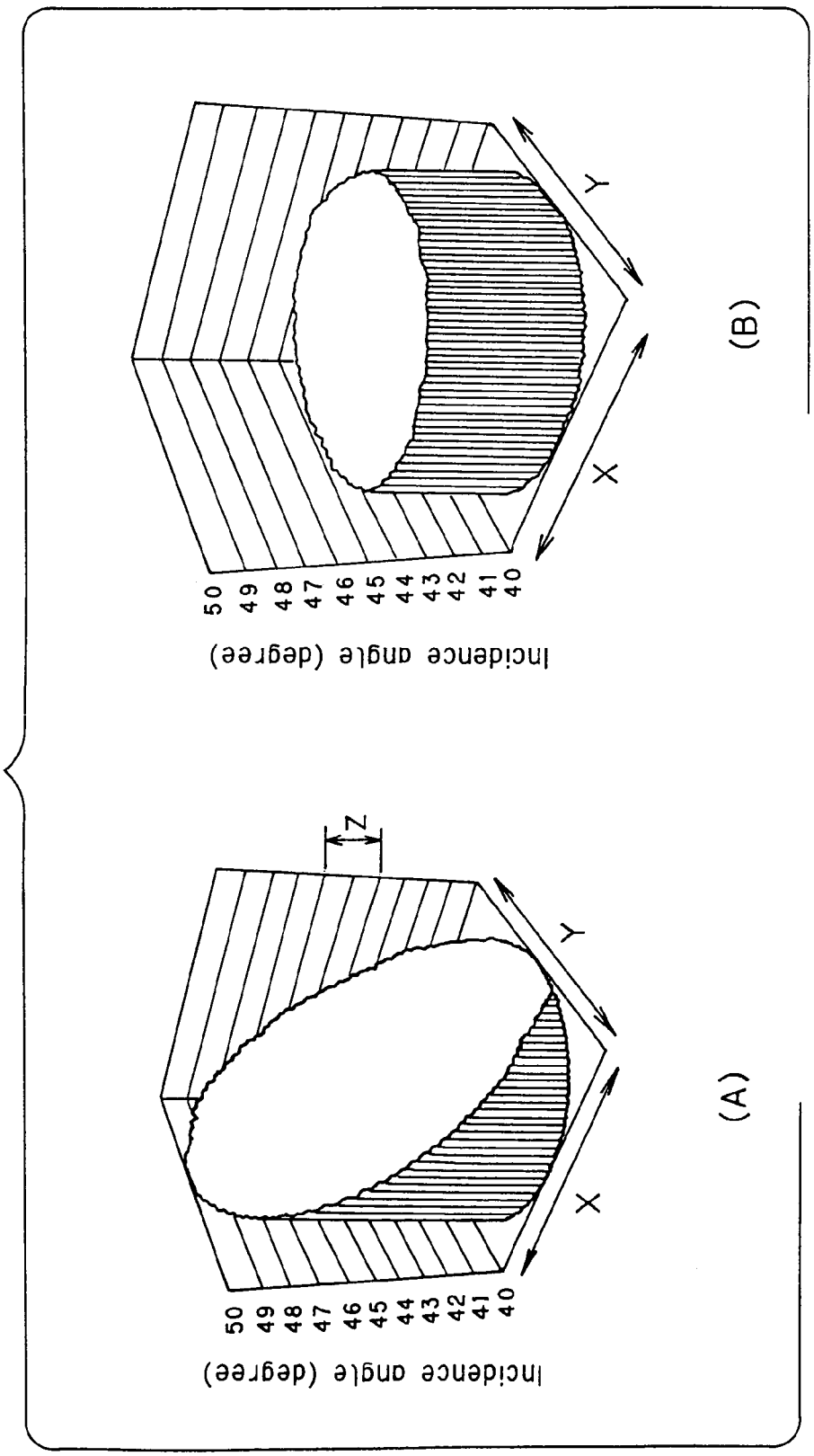
FIG. 5A is a graph showing an incidence angle distribution in a plane type polarized beam splitter.
FIG. 5B is a graph showing the incidence angle distribution in a cylindrical surface type polarized beam splitter.

FIG. 5 shows a three-dimensional graph indicating the angles at which the respective beams forming the divergent luminous flux are incident upon the splitting surface of the polarized beam splitter, and it is supposed that the effective number of openings of the divergent luminous flux is substantially equal to the number of effective openings of the light source in the general MO apparatus and NA=0.146. Moreover, the XY plane of the three-dimensional graph represents the section of the divergent luminous flux, and the X direction corresponds to the direction in which the splitting surface is inclined to the optical axis of the divergent light. The height of the three-dimensional graph indicates the incidence angle. Additionally, since the divergent light is refracted upon the incidence onto the polarized beam splitter as described above, the refractive index of the polarized beam splitter needs to be considered in order to obtain the incidence angle to the splitting surface. Here, BaF11 is selected as a glass material which has a high refractive index, has no problem in mass productivity, and has a high Abbe value, and the refractive index of BaF11 is n=1.661251 to the light with a wavelength of 685 nm.

FIG. 5A is a three-dimensional graph showing the incidence angle of the plane type polarized beam splitter to the splitting surface. The maximum value of the incidence angle distribution shown in this graph is ±5.04°, and the standard deviation of the incidence angle is 2.25°. Moreover, the incidence angle distribution is generated mainly in the X direction, and the distribution is hardly generated in the Y direction. Since the characteristics of the polarized beam splitter largely depend on the incidence angle as described above, the allowable incidence angle distribution is about ±1° at most as described by an arrow z of FIG. 5A, and it is seen that when the divergent light is incident upon the plane type beam splitter, the characteristics of the polarized beam splitter cannot be guaranteed.

FIG. 5B is a three-dimensional graph showing the incidence angle to the optimum designed cylindrical type splitting surface. For the target values of the design of the splitting surface, the maximum value of the incidence angle distribution is within ±0.5°, and the standard deviation of the incidence angle is 0.1° or less. Moreover, as a result, the maximum value of the incidence angle distribution is ±0.22°, and the standard deviation of the incidence angle is 0.08°.

As described above, when the divergent light is incident upon the cylindrical surface type polarized beam splitter, the incidence angle distribution is minimized. As a result, since the characteristics of the polarized beam splitter are guaranteed, the light from the light source is efficiently directed to the optical information storage medium via the polarized beam splitter, and the signal light included in the return light from the optical information storage medium is efficiently split. Moreover, no phase difference of the optical system is generated.

Furthermore, even when the cylindrical surface type polarized beam splitter is disposed in the vicinity of the light source, the characteristics are guaranteed, so that by disposing a small cylindrical surface type polarized beam splitter, or the like in a position with a small luminous flux diameter, a small lightweight optical head can be realized.

Additionally, theoretically, a spherical surface, two-dimensional curved surface, a curved surface having a three-dimensional or more curvature, and the like can be considered as the splitting surface of the polarized beam splitter, but it is difficult to mass-produce these curved surfaces by accurate abrading, glass molding, and the like, and the cost of the optical head employing these curved surfaces is high. Specifically, the spherical surface, the two-dimensional curved surface, and the like are curved surfaces unsuitable as the splitting surface.

The description of the principle of the present invention has been finished, and concrete embodiments will be described hereinafter.

Figure 6:
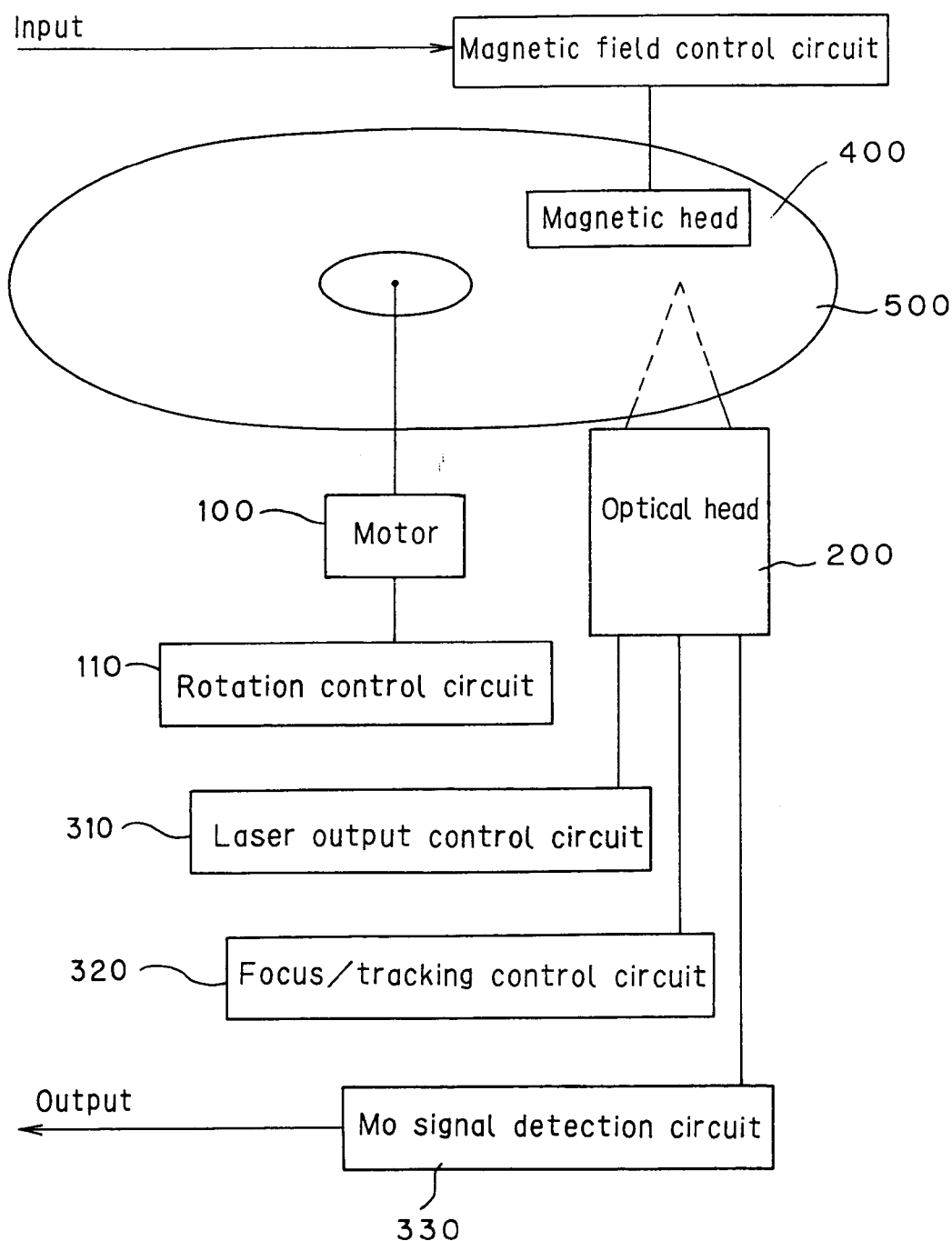
FIG. 6 is a diagram showing a first embodiment of an optical information storage apparatus according to the present invention, which is provided with a first embodiment of an optical device of the present invention.

FIG. 6 is a diagram showing a first embodiment of the optical information storage apparatus of the present invention, which is provided with a first embodiment of the optical device of the present invention.

The optical information storage apparatus is provided with a motor 100 for holding and rotating a magnetic optical disk 500 as one example of the optical information storage medium, and a rotation control circuit 110 for controlling the motor rotation.

Moreover, the optical information storage apparatus is provided with an optical head 200 for focusing/radiating a laser beam to the magnetic optical disk 500, a laser output control circuit 310 for controlling the output of the laser beam, and a focus/tracking control circuit 320 for controlling the focus and tracking of the irradiation light to the magnetic optical disk 500 by the optical head 200.

The optical information storage apparatus is further provided with a magnetic head 400, and a magnetic field control circuit 410. During the information writing, an external magnetic field is added by the magnetic head 400 to a position where the irradiation light is focused onto the magnetic optical disk 500 by the optical head 200, and the strength and direction of the external magnetic field added by the magnetic head are controlled by the magnetic field control circuit 410 in response to an input signal indicative of the information to be written to the magnetic optical disk. Subsequently, the writing information is written by the heat of the irradiation light by the optical head 200 and the external magnetic field by the magnetic head 400.

Furthermore, the optical information storage apparatus is provided with an MO signal detection circuit 330, and during information regeneration, the MO signal indicative of the information stored in the magnetic optical disk (MO disk) 500 is detected and outputted by the MO signal detection circuit 330.

Figure 7:
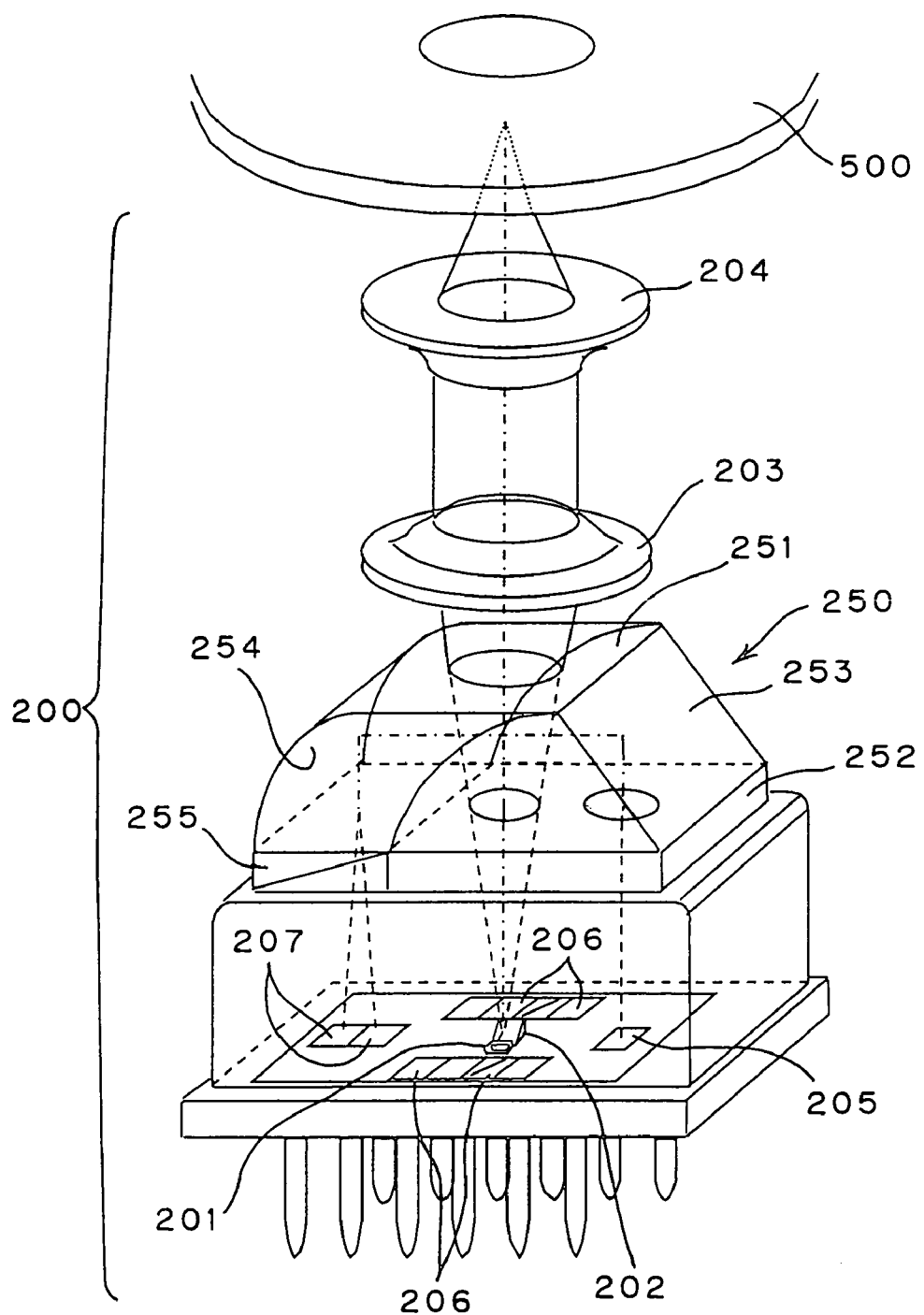
FIG. 7 is a perspective view of the optical head including the first embodiment of the optical device.
Figure 8:
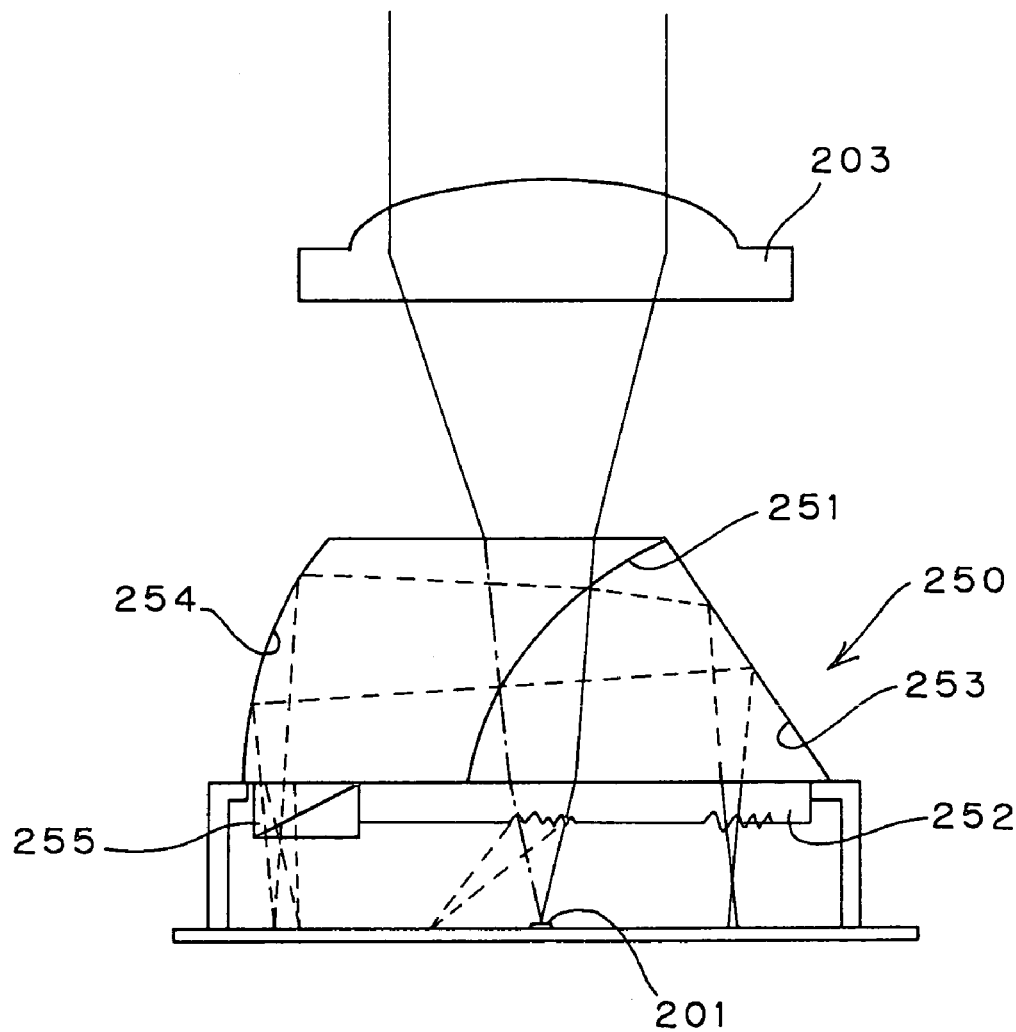
FIG. 8 is a sectional view of the optical head including the first embodiment of the optical device.

FIG. 7 is a perspective view of the optical head including the first embodiment of the optical device, and FIG. 8 is a sectional view of the optical head.

The light source of the optical head 200 is a laser diode 201, and emits the divergent light of linear polarization (P-polarization). Moreover, the magnetic optical disk (MO disk) is used as the optical information storage medium 500.

The optical head 200 is provided with a composite optical device 250 according to the first embodiment of the optical device of the present invention, and this composite optical device 250 is constituted by integrally forming the polarized beam splitter and HOE, and includes a splitting surface 251 constituted of a part of the cylindrical surface as described above. Moreover, since the composite optical device 250 is disposed in a position sufficiently close to the laser diode 201, and the luminous flux of laser beams is sufficiently small, the size of the composite optical device 250 is also sufficiently small.

The P-polarized laser beam emitted from the laser diode 201 is reflected by a reflective mirror 202, transmitted through an HOE part 252 of the composite optical device 250, transmitted through the splitting surface 251 of the composite optical device 250 with a transmittance of about 85%, converted to a parallel light by a collimator 203, and focused/radiated to the magnetic optical disk 500 by an objective lens 204. The collimator 203 and the objective lens 204 constitute one example of an objective optical system according to the present invention. Moreover, about 15% of the light emitted from the laser diode 201 and having reached the splitting surface 251 of the composite optical device 250 is reflected by the splitting surface 251, totally reflected by an inclined surface 253 of the composite optical device 250, and focused upon a photodiode 205 by the HOE part 252. Subsequently, the light quantity is detected by the photodiode 205, and the detection result of the light quantity is fed back to the laser output to control the laser output. The photodiode 205 is one example of an emitted light quantity controlling detector according to the present invention.

The light reflected by the magnetic optical disk 500 returns to the composite optical device 250 via the objective lens 204 and collimator 203. Subsequently, 85% of the P-polarized light returned to the composite optical device 250 is transmitted again through the splitting surface 251, split/focused for respective photodetectors 206 by the HOE part 252, and used for the focus detection and tracking detection by the respective photodetectors 206.

For the light reflected by the magnetic optical disk 500, the component which is generated by rotating the polarization direction of the light focused/radiated upon the magnetic optical disk 500 by the Kerr effect and which has a polarization direction crossing at right angles to the polarization direction of the irradiation light is reflected by the splitting surface 251 with a reflectance of nearly 100%, and the component having the same polarization direction as that of the irradiation light is reflected by the splitting surface 251 with a reflectance of about 15%. The light reflected by the splitting surface 251 is totally reflected by a cylindrical reflective surface 254 having substantially the same curvature as that of the splitting surface 251 to converge, and constitutes one example of a birefringence part according to the present invention, in which the light is split into an ordinary beam and an extraordinary beam by a Wollaston prism part 255 with a crystal axis rotated by 45°. Thereby, the signal light is split to the projective component of the sum component of the angle at which the polarization direction is rotated by the Kerr effect and 45° and the component crossing at right angles to the projective component. Two beams split by the Wollaston prism part 255 are detected by respective photodetectors 207, and the MO signal is differentially detected by obtaining the difference of the light quantities. The photodetector 207 is one example of a signal detector of the present invention.

Figure 9:
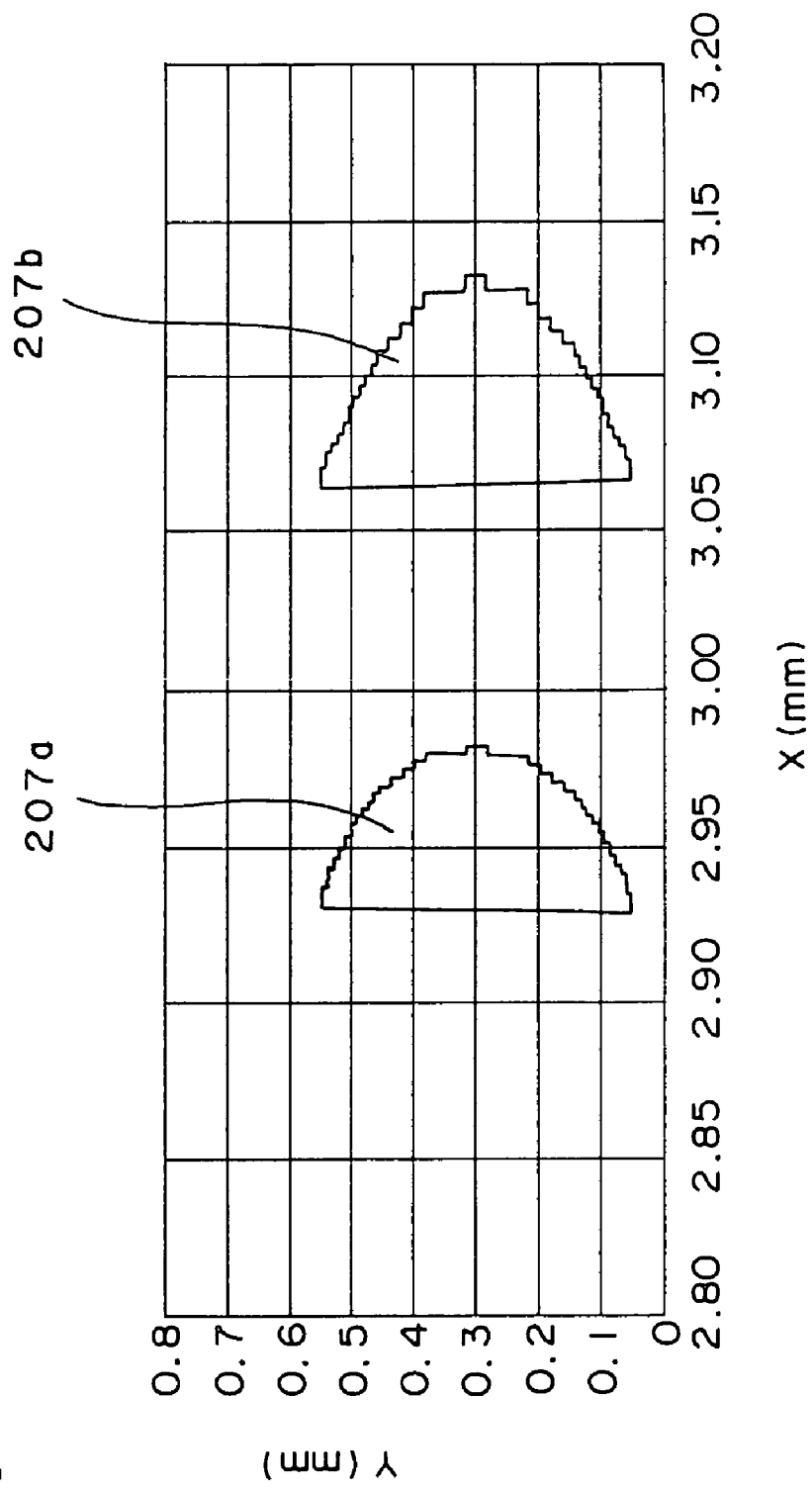
FIG. 9 is a graph showing the state of an ordinary beam and an extraordinary beam split by a Wollaston prism part.

FIG. 9 is a graph showing the states of two beams split by the Wollaston prism part.

This graph shows spots 207*a*, 207*b* of the ordinary and extraordinary beams having reached a plane on which the photodetectors 207 shown in FIG. 7 are disposed, the abscissa of the graph indicates the horizontal direction of FIG. 8, and the ordinate of the graph corresponds to the depth direction of FIG. 8. The ordinary and extraordinary beam spots 207*a*, 207*b* are remarkably clearly split, and the clearly split spots are generated when the light reflected by the above-described splitting surface 251 converges into the cylindrical reflective surface 254 and subsequently passes through the Wollaston prism part 255.

Figure 10:
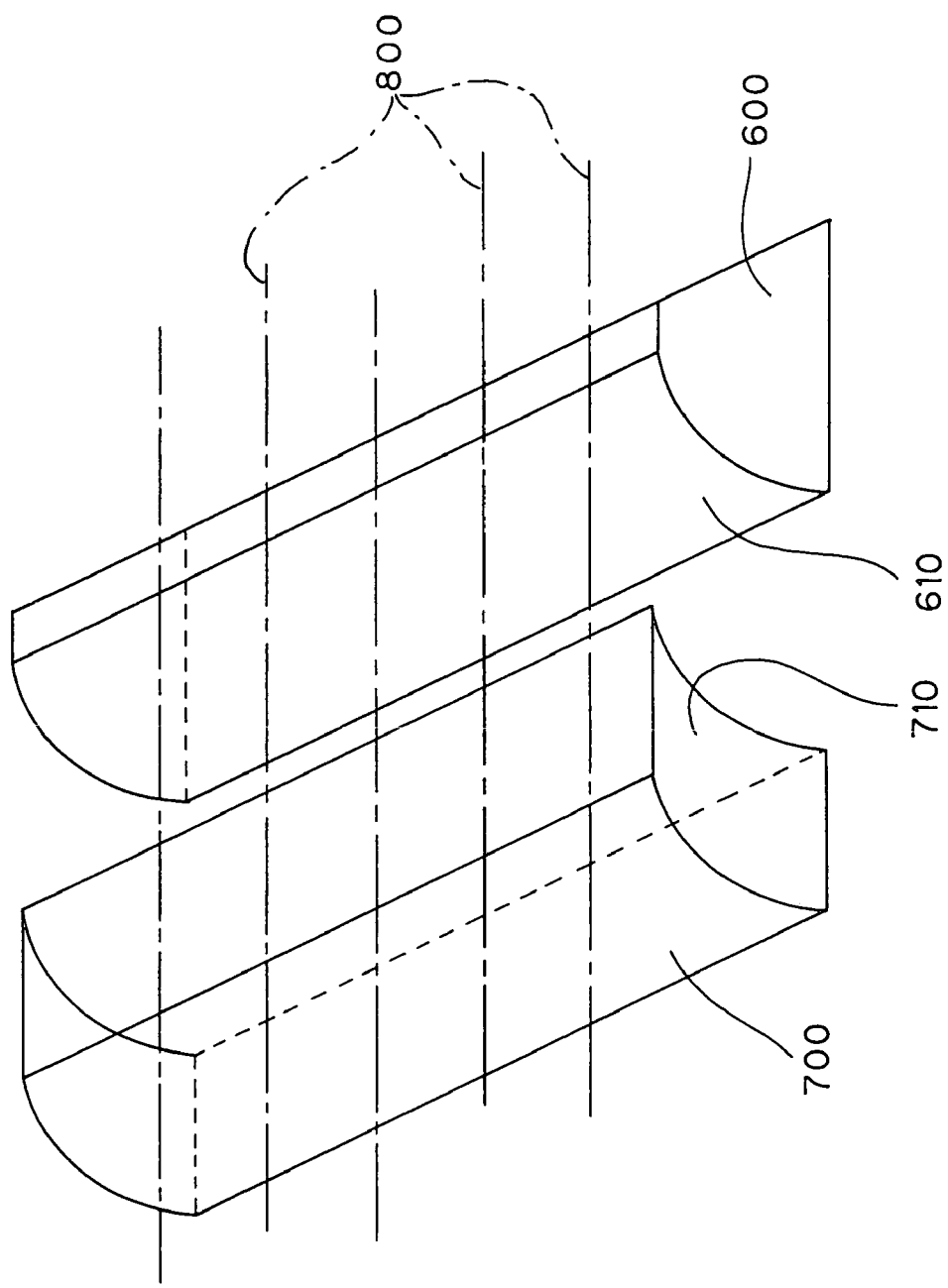
FIG. 10 is an explanatory view showing a procedure of forming a composite optical device.

FIG. 10 is an explanatory view showing a procedure of forming the composite optical device.

To form the composite optical device, first formed are a raw material 600 which has a convex cylindrical surface 610 corresponding to the splitting surface 251 shown in FIGS. 7, 8 and is longitudinal along the generating line of the cylindrical surface 610, and a raw material 700 which has a concave cylindrical surface 710 corresponding to the splitting surface 251. Subsequently, a dielectric multilayered film is deposited on the convex cylindrical surface 610 or the concave cylindrical surface 710, two raw materials 600, 700 are placed to each other so as to hold the dielectric multilayered layer between the cylindrical surfaces 610, 710, and the material is cut into annular materials at desired intervals as shown by dashed lines 800 of FIG. 10. Finally, the composite optical device is formed by attaching the Wollaston prism and HOE.

Here, since the Wollaston prism can be formed by crystal, $LiNbO_3$, rutile, and the like, and the light can sufficiently be split with a thickness of about 1 mm, the prism can be formed very inexpensively. Moreover, HOE is formed by direct drawing and reduced exposure using electron means and laser beams.

The composite optical device can be formed inexpensively in large amounts by the above-described forming procedure. Moreover, since the polarized beam splitter, Wollaston prism, and the like are formed into the integral device, the optical system can be obtained in which the stability is high against the environmental changes such as a temperature change, vibrations, and the like, and a signal detection performance is not deteriorated.

The first embodiment of the optical device of the present invention, and the first embodiment of the optical information storage apparatus of the present invention have been described above, and other embodiments will be described hereinafter.

The other embodiments of the optical information storage apparatus of the present invention are similar to the first embodiment of the optical information storage apparatus, except that there are provided other embodiments of the optical device of the present invention. Only the other embodiments of the optical device will be described below.

Figure 11:
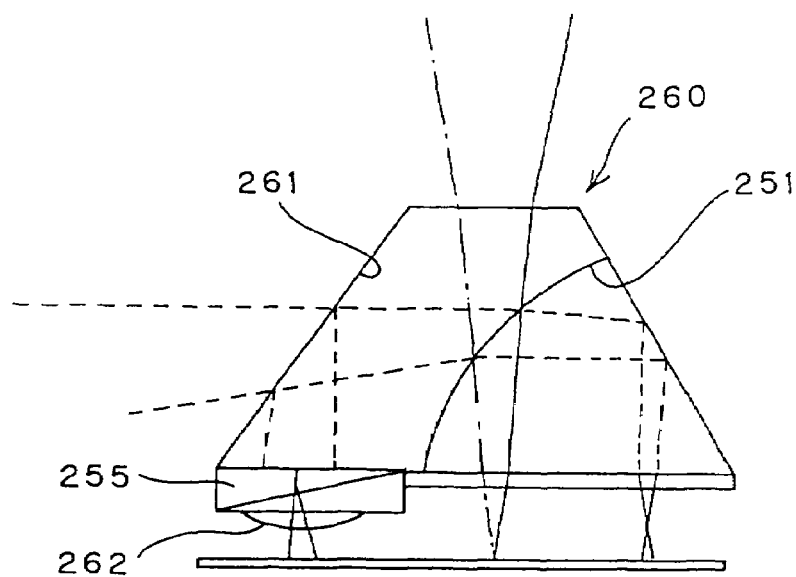
FIG. 11 is a view showing a second embodiment of the optical device of the present invention.

FIG. 11 is a view showing a second embodiment of the optical device of the present invention.

Since a composite optical device 260 according to the second embodiment of the optical device of the present invention is similar to the composite optical device 250 shown in FIG. 8, except that the device includes a flat reflective surface 261 instead of the cylindrical reflective surface 254, and a lens 262 as one example of a focus part of the present invention, only the different respects will be described, and redundant description is omitted.

The splitting surface 251 shown in FIG. 11 is a splitting surface similar to the splitting surface Q described with reference to FIG. 4.

The signal light reflected by the splitting surface 251 is totally reflected by the flat reflective surface 261, and split to two beams as the divergent luminous flux by the Wollaston prism part 255, and two beams are focused on different positions by the lens 262, and detected by the photodetector (not shown).

Figure 12:
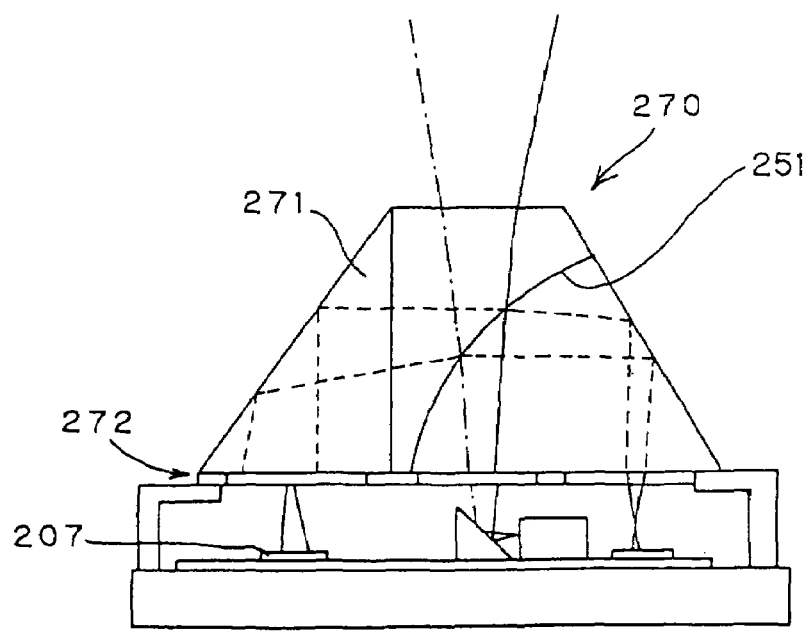
FIG. 12 is a view showing a third embodiment of the optical device of the present invention.

FIG. 12 is a view showing a third embodiment of the optical device of the present invention.

Since a composite optical device 270 according to the third embodiment of the optical device of the present invention is similar to the composite optical device 250 shown in FIG. 8, except that the device includes a birefringence prism part 271 also serving as a reflective v prism and being one example of the birefringence part of the present invention, and an HOE part 272 as one example of the focus part of the present invention, only the different respects will be described, and the redundant description is omitted.

The signal light reflected by the splitting surface 251 is split into two beams by the birefringence prism part 271 and reflected by the inclined surface, and two beams are focused on different positions by the HOE part 272, and detected by the photodetector 207.

Figure 13:
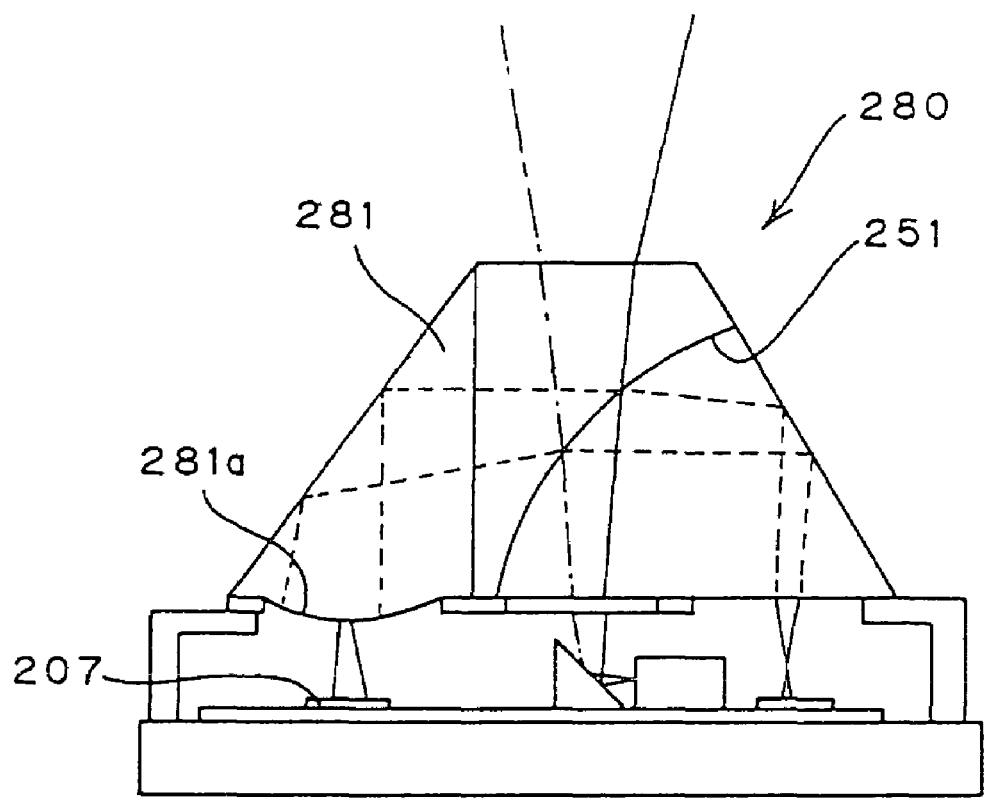
FIG. 13 is a view showing a fourth embodiment of the optical device of the present invention.

FIG. 13 is a view showing a fourth embodiment of the optical device of the present invention.

Since a composite optical device 280 according to the fourth embodiment of the optical device of the present invention is similar to the composite optical device 250 shown in FIG. 8, except that the device includes a birefringence prism part 281 also serving as the reflective prism, further serving as the focus part of the present invention, and being one example of the birefringence part of the present invention, only the different respects will be described, and the redundant description is omitted.

The signal light reflected by the splitting surface 251 is split into two beams by the birefringence prism part 281, reflected by the inclined surface, further refracted by a convex surface 281a of the birefringence prism part 281, and two beams are focused on the different positions, and detected by the photodetector 207.

Figure 14:
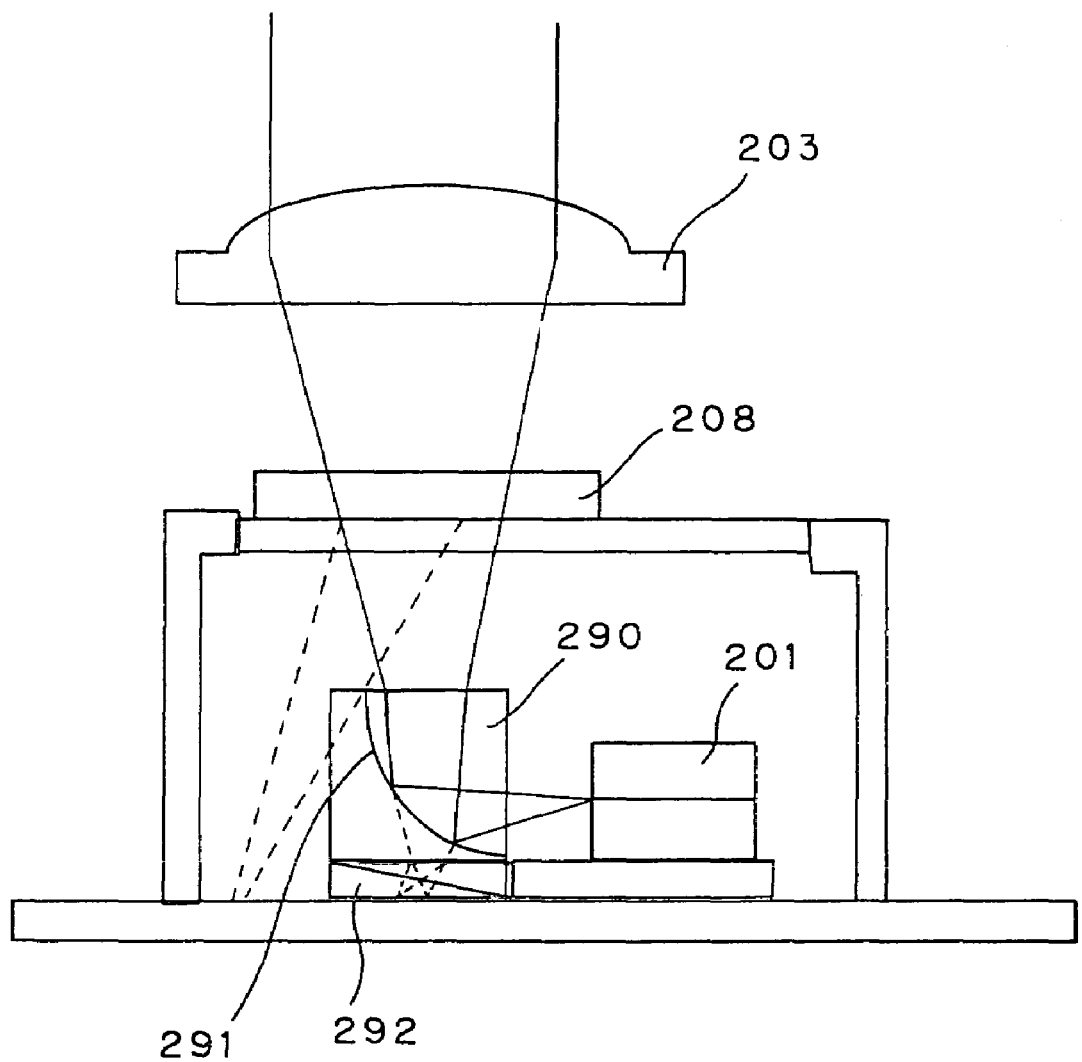
FIG. 14 is a view showing a fifth embodiment of the optical device of the present invention.

FIG. 14 is a view showing a fifth embodiment of the optical device of the present invention.

Since a composite optical device 290 according to the fifth embodiment of the optical device of the present invention includes a splitting surface 291 constituted of a part of the cylindrical surface, and the emitted light from the laser diode 201 is reflected by the splitting surface 291 of the composite optical device 290. The light reflected by the splitting surface 291 is transmitted through an HOE 208, and incident upon the collimator 203. A part of the return light having returned via the collimator 203 is split/focused by the HOE 208 for the focus detection and tracking detection, and a most part excluding the split part is transmitted through the HOE 208. For the light transmitted through the HOE 208, the signal light is transmitted through the splitting surface 291 and refracted by the splitting surface 291 to converge, split in two beams by a Wollaston prism part 292 and detected.

Additionally, since the light transmitted through the HOE 208 is a convergent light, and where there is an allowance in space, the splitting surface 291 may be a surface through which the straight advancing signal light is transmitted.

The fifth embodiment of the present invention has been completely described above.

Additionally, in the above-described embodiments, the Wollaston prism part and the birefringence prism part have been described as the examples of the birefringence part of the present invention, but the birefringence part of the present invention is not limited as long as the light is split into the ordinary and extraordinary beams, and may be, for example, a Nicole prism or a Rochon prism.

Moreover, the optical information storage medium of the present invention is not limited to the above-described magnetic optical disk, and needless to say, a phase change type disk may be used.

Additionally, to realize the high-precision reading or writing of recorded data with the optical information storage apparatus, the light output adjustment of the light source is important. For example, since there is an optimum light intensity dependent on medium characteristics, recording rate, and the like during the reading/writing of the recorded data, the light source output has to be adjusted and adapted to the intensity. Moreover, during the data writing, to enhance a reading precision, by generating a plurality of pulses with changed periods for one recording bit, the shape of the recording bit on the recording medium is adjusted to provide a shape suitable for the reading. Individual pulse intensities also need to be adjusted.

Therefore, in the above-described embodiment, as shown in FIG. 8, the light reflected by the splitting surface 251 is totally reflected by the inclined surface 253, and focused upon the photodiode 205 by the HOE part 252, the light quantity is detected by the photodiode 205, and the laser output is adjusted based on the detection result. Specifically, since the intensity of the light radiated onto the recording medium is proportional to the intensity of the light incident upon the photodiode 205, by beforehand measuring the proportional coefficient of the output of the photodiode 205 and the intensity of the light radiated onto the recording medium, the light intensity on the recording medium can be measured in real time. Subsequently, the measured light intensity is fed back to the laser output control circuit 310 shown in FIG. 6, and an automatic power control (APC) is performed.

Here, for the area of the light receiving surface of the photodiode 205 for the APC, a smaller area is preferable as described below.

When the area of the light receiving surface is large, the influence of stray light is large and the response rate is low. Moreover, when the stray light influence is large, the accurate light intensity measurement is obstructed, and the stable reading operation of the optical disk apparatus is obstructed. Furthermore, when the response rate is low, the APC during the writing cannot accurately be performed, and the recording bit shape is disturbed. Specifically, the reduction of the area of the photodiode 205 is important in order to stabilize the APC and enhance the reading ability of the optical head.

Therefore, it is proposed to focus the light upon one point by the HOE part 252 shown in FIG. 8 and reduce the light receiving surface of the photodiode 205.

Figure 15:
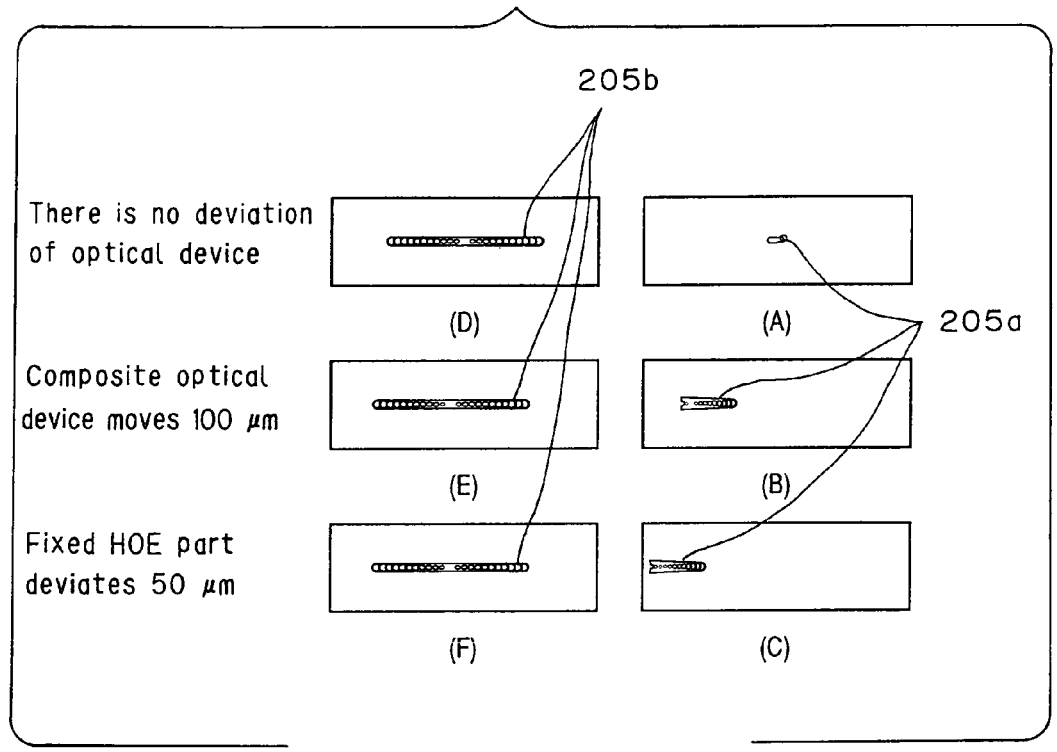
FIG. 15 is a view showing light spots focused upon a photodiode.

FIG. 15 is a view showing a light spot focused upon the photodiode 205.

FIGS. 15A, 15B, and 15C show the results obtained when the spot of the light focused upon the light receiving surface of the photodiode 205 by the HOE part 252 for focusing the light upon one point is calculated by tracking beams.

FIG. 15A shows a spot 205a generated by focusing the light upon one point by the HOE part 252. As described above, the light emitted from the laser diode 201 shown in FIG. 8 is a divergent light, the divergent light is reflected by the splitting surface 251 constituted of a part of the cylindrical surface, and the luminous flux is provided with a complicated divergent/convergent state in accordance with the divergent angle of the emitted light and the curvature of the splitting surface 251 and is incident upon the HOE part 252. Therefore, the design of the HOE part 252 for focusing the luminous flux with the divergent/convergent state to one point is also complicated.

Moreover, since the composite optical device 250, laser diode 201, and photodetector 207 have manufacture and attachment errors, two spots 207a, 207b shown in FIG. 9 are not accurately incident onto the predetermined positions of the photodetector 107. Furthermore, in order to correct the incident positions of two spots 207a, 207b, the composite optical device 250 needs to be moved in the horizontal direction of FIG. 8, and as a result, the HOE part 252 moves with respect to the photodiode 205. FIG. 15B shows the light spot 205a obtained when as a result of the movement of the composite optical device 250, the splitting surface 251 of the beam splitter of the composite optical device 250 moves by 100 µm in the horizontal direction of FIG. 8. This spot 205a is shown in a position largely deviating from the position shown in FIG. 15A.

Furthermore, there is a case in which the relative position of the HOE part 252 and photodiode 205 deviates from the designed position by the manufacture error, and the like of the composite optical device 250. FIG. 15C shows the light spot 205a obtained when in addition to the movement of the composite optical device 250, the attachment error of the HOE part 252 is generated by 50 µm in the horizontal direction of FIG. 8, and this spot movement is further larger than the spot movement shown in FIG. 15B.

FIGS. 15D, 15E, and 15F will be described later.

The movement of the spot 205a shown in FIGS. 15B and 15C can be avoided by adjusting and fixing the position of the HOE part 252 independently of the composite optical device 150, but the independent adjustment increases the number of assembly processes, complicates the adjustment and is not realistic. Therefore, the area of the light receiving surface needs to be enlarged to cover the movement range of the spot 205a, so that even when the composite optical device 250 moves, the spot 205a does not deviate from the light receiving surface of the photodiode 205.

Consequently, even when the light is focused to one point by the HOE part 252 for the purpose of reducing the light receiving surface of the photodiode 205, by generally considering the manufacture error, and the like of the composite optical device 250, a larger light receiving surface is necessary.

Therefore, an embodiment will be described hereinafter in which the manufacture error, and the like of the composite optical device are generally considered, and the miniaturization of the light receiving surface can be realized.

Figure 16:
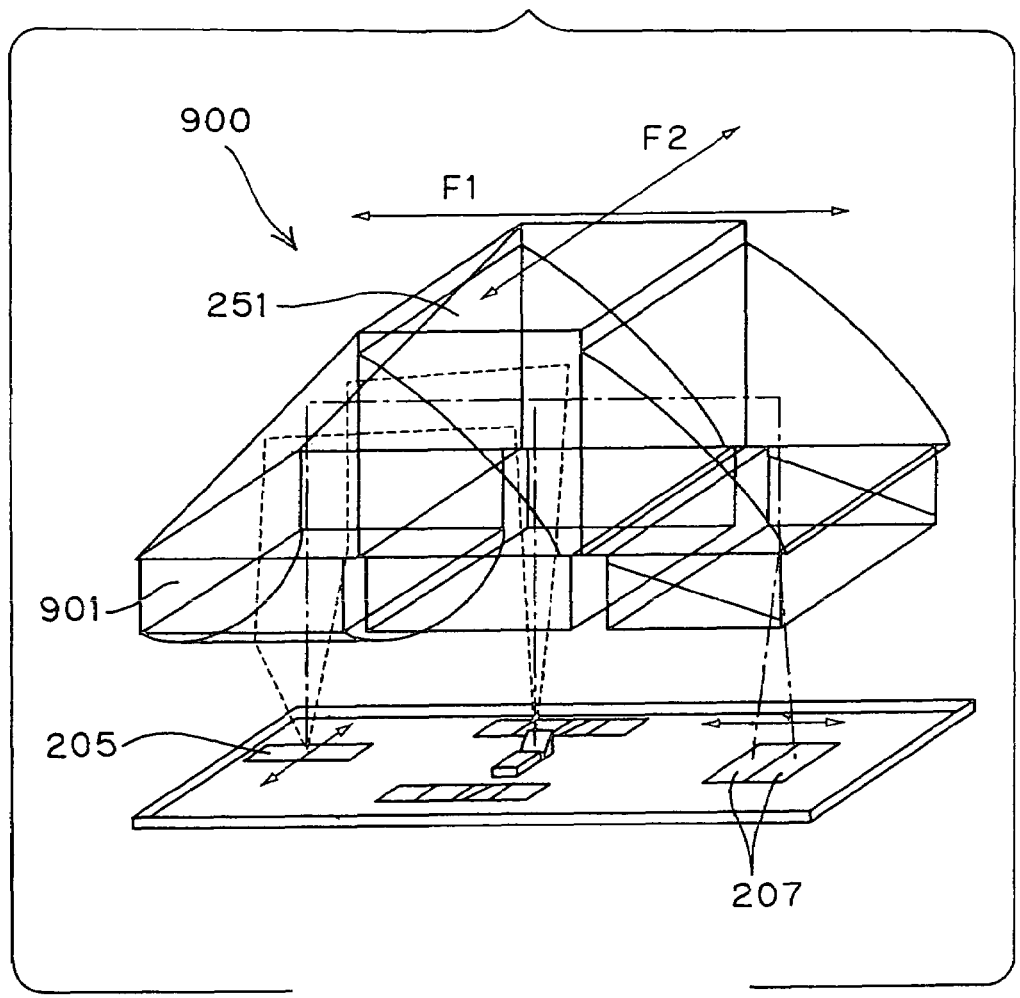
FIG. 16 is a view showing a sixth embodiment of the optical device of the present invention.

FIG. 16 is a view showing a sixth embodiment of the optical device of the present invention.

Since a composite optical device 900 according to the sixth embodiment of the optical device of the present invention is similar to the composite optical device 250 shown in FIG. 8, except that the device includes a cylindrical lens 901 instead of the part for passing the light incident on the photodiode 205, only the different respects will be described, and redundant description is omitted.

The cylindrical lens 901 is one example of the convergence part of the present invention, and the light converges in the generating line of the splitting surface 251 shown by an arrow F2 and is incident upon the photodiode 205. Specifically, the direction in which the light is focused is vertical to the direction in which the splitting surface 251 has a curvature.

FIG. 15D shows the spot 205b of the light transmitted to the photodiode 205 via the cylindrical lens 901, and the spot 205b is elongated in the direction shown by an arrow F1 of FIG. 16. With regard to the elongated spot 205b, the spot movement is studied in a similar manner as FIGS. 15B and 15C where the composite optical device 900, and the like deviate in position.

FIG. 15E shows the spot 205b when the composite optical device 900 moves by 100 µm in the direction shown by the arrow F1 of FIG. 16, and this spot 205b hardly move from the position shown in FIG. 15D.

Moreover, FIG. 15F shows the spot 205b when in addition to the movement of the composite optical device 900 the attachment error of the cylindrical lens 901 is generated by 50 µm in the direction shown by the arrow F1 of FIG. 16, and this spot 205b does not move at all from the position shown in FIG. 15E.

When the light converges in the generating line (the direction shown by the arrow F2 of FIG. 16) of the splitting surface 251 and is incident upon the photodiode 205 by the cylindrical lens 901, with respect to the direction shown by the arrow F1 of FIG. 16, the spot size itself is slightly enlarged, but the spot movement with the position deviation of the composite optical device 900, and the like is suppressed, and the size of the photodiode 205 in the direction shown by the arrow F1 can be reduced. In other words, by employing the cylindrical lens 901, the focus performance change by the movement of the composite optical device 900 can be reduced, and the deterioration of APC detection can largely be prevented.

Moreover, with regard to the generating line of the splitting surface 251 shown by the arrow F2 of FIG. 16, even when the composite optical device 900 is moved, the spot on the photodetector 207, and the luminous flux directed to the magnetic optical disk do not move. Therefore, even when the attachment error of the cylindrical lens 901, and the like are generated in the bus direction of the splitting surface 251, by moving the composite optical device 900 in the generating line of the splitting surface 251, the spot 205b shown in FIG. 15D or the like can be adjusted to come onto the photodiode 205. Therefore, with regard to the generating line of the splitting surface 251, the light sufficiently converges, and the size of the photodiode 205 can remarkably be reduced.

Consequently, by widening the light receiving surface of the photodiode 205 in the direction in which the splitting surface 251 has a curvature and narrowing the surface in the direction vertical to the direction, the area of the light receiving surface can be minimized. Moreover, by reducing the area of the light receiving surface, the response rate of the photodiode 205 can be enhanced. This further contributes to the enlargement of an allowable assembly value, the increase of the detected light quantity and the enhancement of the characteristics of the output feedback circuit.

Figure 17:
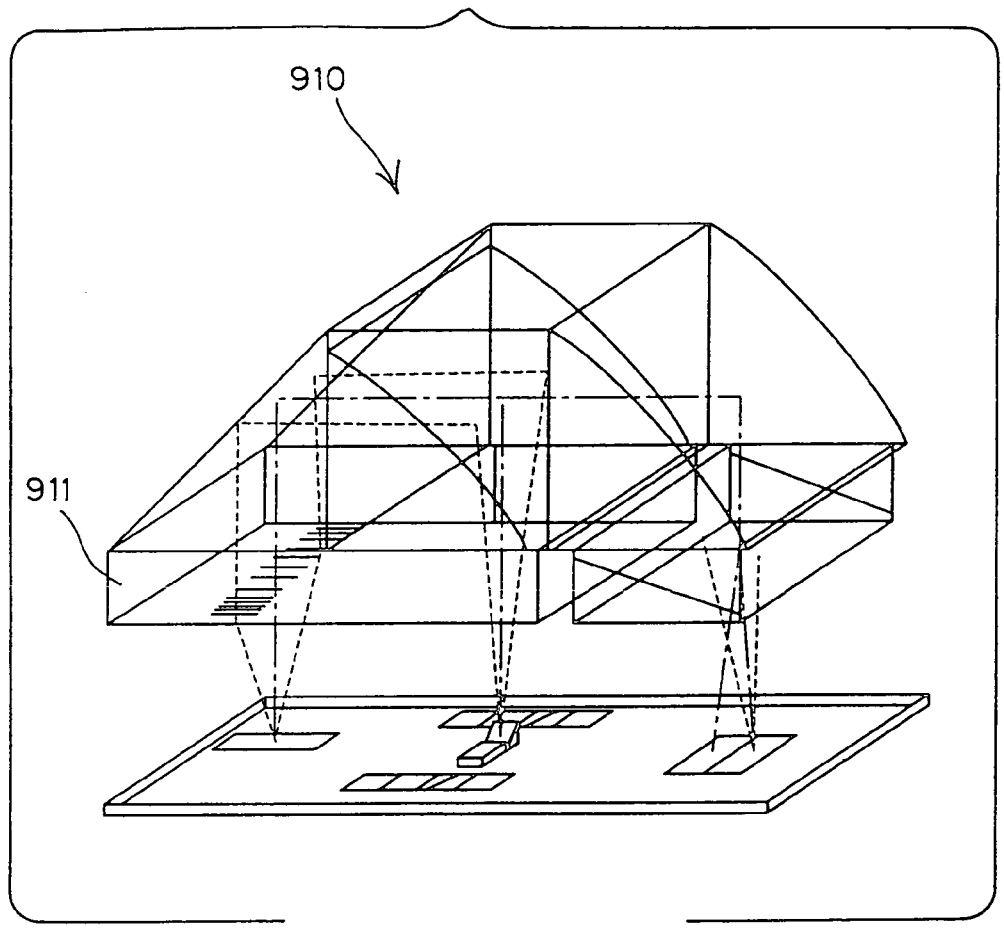
FIG. 17 is a view showing a seventh embodiment of the optical device of the present invention.

FIG. 17 is a view showing a seventh embodiment of the optical device of the present invention.

A composite optical device 910 according to the seventh embodiment of the optical device of the present invention is similar to the composite optical device 900 shown in FIG. 16, except that the device includes an HOE part 911 having the focus performance similar to that of the cylindrical lens 901 shown in FIG. 16.

The HOE part 911 is also one example of the convergence part of the present invention, and in the HOE part 911, the part for focusing the servo detecting light and the part for focusing the APC light are integrally formed in a similar manner as in the HOE part 252 shown in FIG. 8.

The light spots shown in FIG. 15D, and the like are formed even by the HOE part 911, and as a result, the light receiving surface of the photodiode 205 can be miniaturized.

Figure 18:
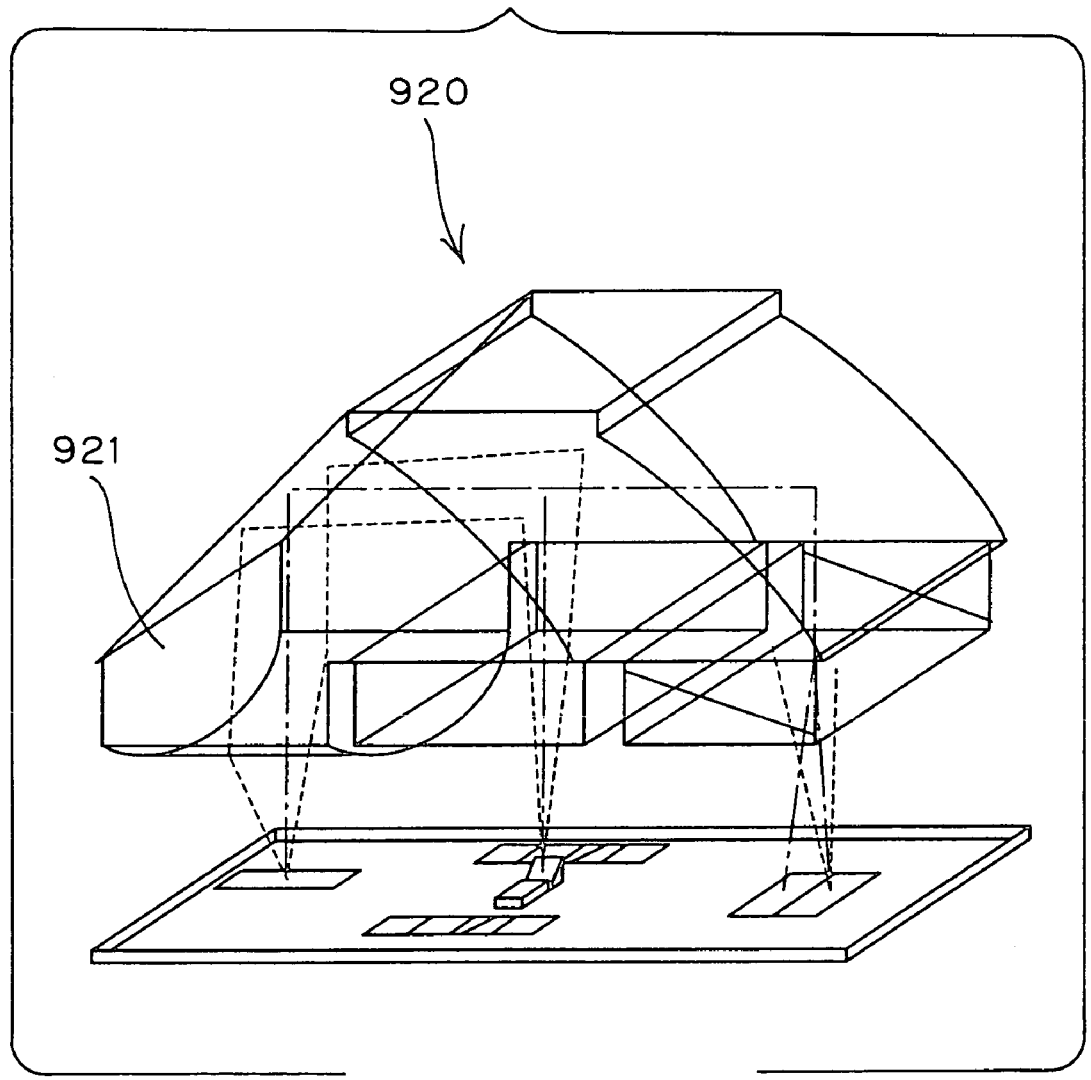
FIG. 18 is a view showing an eighth embodiment of the optical device of the present invention.

FIG. 18 is a view showing an eighth embodiment of the optical device of the present invention.

A composite optical device 920 according to the eighth embodiment of the optical device of the present invention is similar to the composite optical device 900 shown in FIG. 16, except that the device includes a reflective convergence part 921 integrally formed of the reflective prism and the cylindrical lens by a mold forming technique.

The optical performance of the composite optical device 920 shown in FIG. 18 is the same as the optical performance of the composite optical device 900 shown in FIG. 16. Moreover, by integrally forming the reflective prism and the cylindrical lens, the cost reduction can be realized by deleting the assembly process of fixing the cylindrical lens to the composite optical device, and the attachment error can also be reduced.

Figure 19:
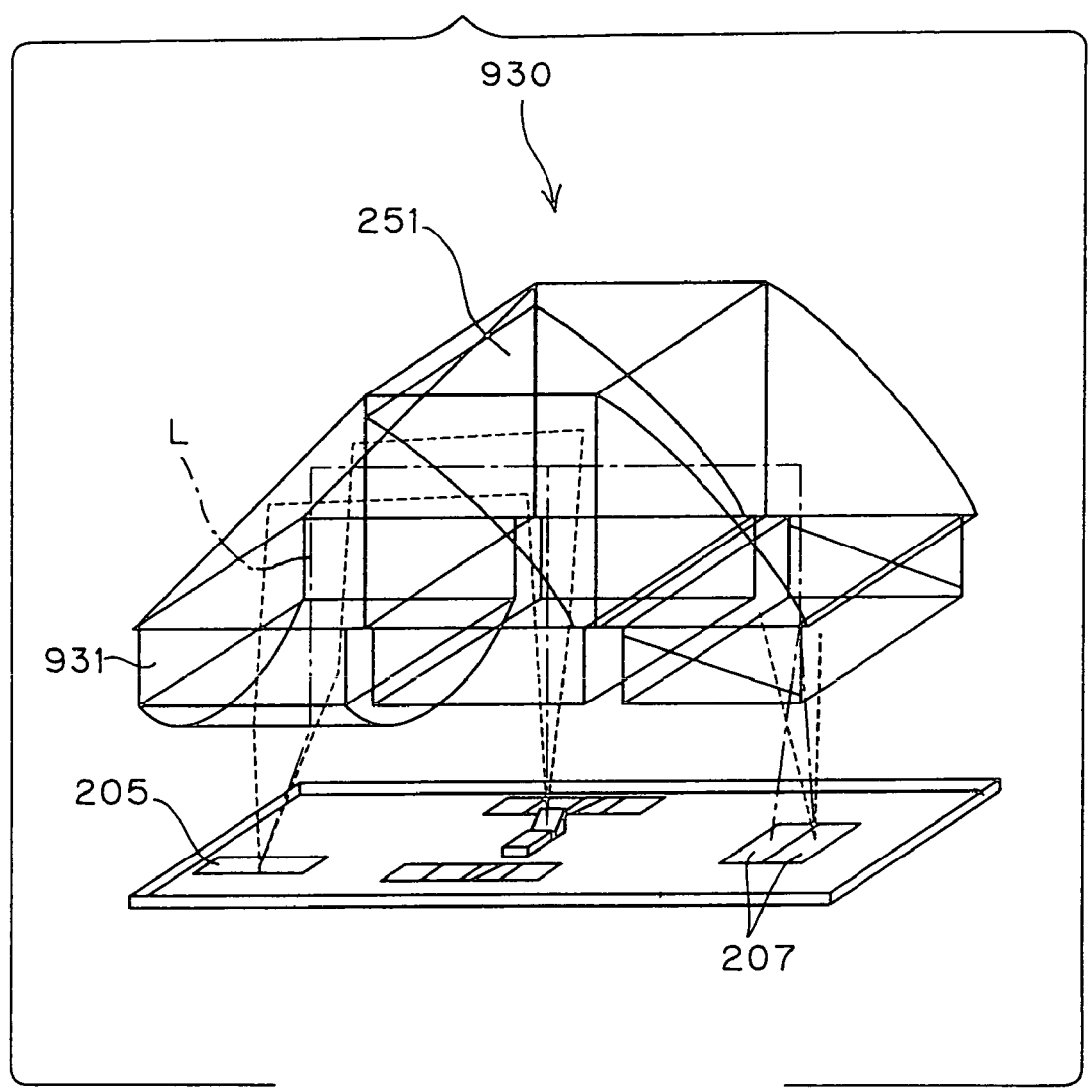
FIG. 19 is a view showing a ninth embodiment of the optical device of the present invention.

FIG. 19 is a view showing a ninth embodiment of the optical device of the present invention.

A composite optical device 930 according to the ninth embodiment of the optical device of the present invention is similar to the composite optical device 900 shown in FIG. 16, except that the device is provided with a cylindrical lens 931 whose main axis deviates from the main beam L of the light reflected by the splitting surface 251.

The light incident upon the photodiode 205 causes surface reflection on the light receiving surface without being converted to a signal by 100%. When the light reflected by the light receiving surface returns to the composite optical device 930 again, the light is incident upon the photodetector 207, and the like to cause the stray light, thereby deteriorating the signal detecting performance and servo detecting performance. Therefore, in the eighth embodiment, the cylindrical lens 931 is disposed so that the main beam of the light incident upon the cylindrical lens 931 deviates from the main axis of the cylindrical lens 931.

Figure 20:
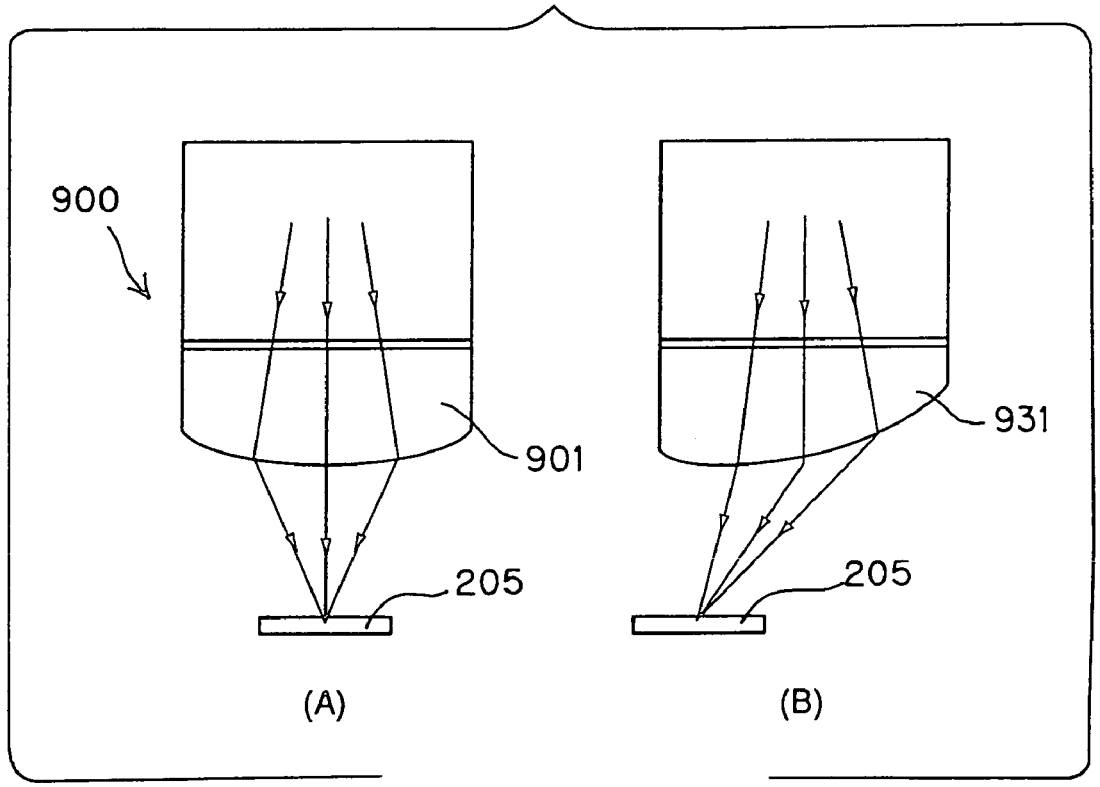
FIG. 20 is an explanatory view of an effect when the main axis of a cylindrical lens deviates from a main beam.

FIG. 20 is an explanatory view of an effect when the main axis of the cylindrical lens deviates from the main beam.

FIG. 20A shows that the light is focused when the main axis of the cylindrical lens 901 is aligned with the main beam as shown in FIG. 16, and the light focused by the cylindrical lens 901 is incident upon the light receiving surface of the photodiode 205 directly from its opposite position. There is a possibility that the light reflected by the light receiving surface returns to the composite optical device 900 via the cylindrical lens 901.

On the other hand, FIG. 20B shows that the light is focused by the cylindrical lens 931 shown in FIG. 19, and the light focused by the cylindrical lens 931 is obliquely incident upon the light receiving surface of the photodiode 205. Therefore, the reflected light from the light receiving surface advances apart from the cylindrical lens 931. This can prevent the reflected light from returning to the signal detecting system or the servo detecting system. Moreover, a diffraction grating device (HOE) having the focus characteristics similar to those of the cylindrical lens 931 can be designed.

FIG. 21 is a diagram showing the design example of the diffraction grating device (HOE) having focus characteristics similar to those of the cylindrical lens 931, FIG. 21A is a graph of the grating space frequency of the diffraction grating device, and FIG. 21B shows that the light is focused by the diffraction grating device.

The abscissa of FIG. 21A shows the position of the light on the diffraction grating device on the basis of the incidence position of the main beam of the light incident upon the diffraction grating device, and the ordinate of FIG. 21A shows the grating space frequency of the diffraction grating device. Moreover, a curve M on the graph of FIG. 21A shows the design value of the diffraction grating. The minimum point of this curve M deviates from a position "0" which means that the optical axis of the diffraction grating device deviates from the main beam. The diffraction grating device designed as described above can easily be formed by a stepper exposure technique, or a direct drawing technique using laser or electron beams.

FIG. 21B shows the result obtained by beam tracking with respect to the state of the light focused by a diffraction grating device 941 designed as shown in the graph of FIG. 21A, and the light is obliquely incident upon the light receiving surface of the photodiode 205.

What is claimed is:

1. An optical information storage apparatus comprising:
a light source for emitting a divergent light;
an objective optical system for focusing the light emitted from said light source upon an optical information storage medium to generate a return light at least partially including a signal light corresponding to stored information, and for converting the return light from the optical information storage medium to convergent light and directing the light toward said light source; and
an optical device, positioned between said light source and said objective optical system, for passing and guiding the light emitted from said light source to said objective optical system, and for splitting the signal light from the return light reflected by said optical information storage medium and returned via said objective optical system,
said optical device comprising a splitting surface formed of a part of a cylindrical surface, passing and guiding the light emitted from said light source via a concave surface side of the splitting surface to said objective optical system, and splitting, by said splitting surface, said signal light from the return light which returns via the same route as the route when guided to the objective optical system and which is incident upon a convex surface side of the splitting surface.

2. The optical information storage apparatus according to claim 1 wherein said optical information storage medium generates the return light at least partially including the signal light polarized in a predetermined polarization direction, and said optical device has, as said splitting surface, a surface which has a relatively high reflectance with respect to the light polarized in said predetermined polarization direction, and has a relatively low reflectance with respect to the light polarized in the polarization direction perpendicular to the predetermined polarization direction.

3. The optical information storage apparatus according to claim 1 wherein said objective optical system comprises a collimating lens for converting the emitted light from said light source to a parallel light, and an objective lens for focusing the parallel light upon said optical information storage medium.

4. The optical information storage apparatus according to claim 1, further comprising:
 a signal detector for detecting said signal light; and
 a servo detector for detecting the position of an irradiation light with respect to said optical information storage medium, wherein:
 the signal light split from the return light by said splitting surface is guided by said signal detector, and the return light transmitted through the splitting surface is guided by said servo detector.

5. The optical information storage apparatus according to claim 1 wherein said optical device comprises a birefringence part for further splitting the signal light split by said splitting surface into an ordinary beam and an extraordinary beam.

6. The optical information storage apparatus according to 5, further comprising a signal detector, constituted of two optical detectors, for detecting said signal light, wherein:
 said optical device comprises a reflecting surface formed of a part of a cylindrical surface, reflects the signal light split by said splitting surface on a concave surface side of the reflecting surface to converge the signal light, and further splits the signal light converged by the reflecting surface into the ordinary beam and the extraordinary beam by said birefringence part for differential outputs of said two optical detectors.

7. The optical information storage apparatus according to claim 5 wherein said optical device comprises a focus part for focusing the ordinary beam and the extraordinary beam split by said birefringence part upon positions which are different from each other.

8. The optical information storage apparatus according to claim 1, further comprising an emitted light quantity controlling detector for detecting a light for controlling the emitted light quantity of said light source, wherein:
 said optical device transmits and guides the emitted light from said light source via the concave surface side of said splitting surface to said objective optical system, and said optical device comprises a convergence part for allowing the light reflected on the concave surface side on the splitting surface in the emitted light from the light source to converge in generating line of the splitting surface and for transmitting the light into said emitted light quantity controlling detector.

9. The optical information storage apparatus according to claim 8 wherein said emitted light quantity controlling detector comprises a light receiving surface longitudinal in a direction perpendicular to generating line of the splitting surface.

10. The optical information storage apparatus according to claim 8 wherein the convergence part of said optical device is disposed so that a main optical axis deviates from the main beam of the light reflected by the concave surface side of said splitting surface.

11. The optical information storage apparatus according to claim 1 wherein said optical device transmits and guides the emitted light from said light source to said objective optical system via the concave surface side of said splitting surface, and said optical device further comprises a transmission part for transmitting the light transmitted by said splitting surface into photodetectors for the focus detection and for the tracking detection.

12. An optical information storage apparatus comprising:
 a light source for emitting a divergent light;
 an objective optical system for focusing the light emitted from said light source upon an optical information storage medium to generate a return light at least partially including a signal light corresponding to stored information, and for converting the return light from the optical information storage medium to convergent light and directing the light toward said light source; and
 an optical device, positioned between said light source and said objective optical system, for passing and guiding the light emitted from said light source to said objective optical system, and for splitting the signal light from the return light reflected by said optical information storage medium and returned via said objective optical system,
 said optical device comprising a splitting surface formed of a part of a cylindrical surface, passing and guiding the light emitted from said light source via a concave surface side of the splitting surface to said objective optical system, and splitting, by said splitting surface, said signal light from the return light which returns via the same route as the route when guided to the objective optical system and which is incident upon a convex surface side of the splitting surface,
 wherein said optical device has, as said splitting surface, a surface which can split said signal light from the return light incident at an incidence angle of 45°.

13. An optical device, disposed between an objective optical system for focusing a light emitted from a light source for emitting a divergent light upon an optical information storage medium to generate a return light at least partially including a signal light corresponding to stored information and for converting the return light from the optical information storage medium to a convergent light and directing the convergent light toward said light source and said light source, for passing and % guiding the emitted light from said light source to said objective optical system, and for splitting the signal light from the return light reflected by said optical information storage medium and returned via said objective optical system, the optical device comprising a splitting surface constituted of a part of a cylindrical surface, the optical device passing and guiding the emitted light from said light source to said objective optical system via the concave surface side of the splitting surface, and splitting, by said splitting surface, said signal light from the return light which returns via the same route as the route when guided to the objective optical system and which is incident on the convex surface side of the splitting surface.

14. The optical device according to claim 13, which further comprises: a reflecting surface formed of a part of the cylindrical surface; and
 a birefringence part for further splitting the signal light by said splitting surface to an ordinary beam and an extraordinary beam,
 which reflects the signal light split by said splitting surface on the concave surface side of said reflecting surface to converge the signal light, and further splits the signal light converged by the reflecting surface into an ordinary beam and an extraordinary beam by said birefringence part for differential outputs of two optical detectors.

15. The optical device according to claim 13 which transmits and guides the emitted light from said light source to said objective optical system via the concave surface side of said splitting surface, and which comprises a convergence part for allowing the light reflected on the concave surface side of said splitting surface in the emitted light from said light source to converge in the generating line of the splitting surface and for transmitting the light into an emitted light quantity controlling detector for detecting a light for controlling the emitted light quantity of said light source.

16. The optical device according to claim 15 wherein said emitted light quantity controlling detector comprises a light receiving surface longitudinal in a direction perpendicular to generating line of the splitting surface.

17. The optical device according to claim 15 wherein the convergence part of said optical device is disposed so that a main optical axis deviates from the main beam of the light reflected by the concave surface side of said splitting surface.

18. The optical device according to claim 13 which transmits and guides the emitted light from said light source to said objective optical system via the concave surface side of said splitting surface, and which comprises a transmission part for transmitting the light transmitted via said splitting surface into photodetectors for the focus detection and for the tracking detection.

19. An optical information storage apparatus comprising:
a light source for emitting a divergent light;
an objective optical system for focusing the light emitted from said light source upon an optical information storage medium to generate a return light at least partially including a signal light corresponding to stored information, and for converting the return light from the optical information storage medium to convergent light and directing the light toward said light source; and
an optical device, positioned between said light source and said objective optical system, for passing and guiding the light emitted from said light source to said objective optical system, and for splitting the signal light from the return light reflected by said optical information storage medium and returned via said objective optical system, wherein said optical device comprises: a splitting surface formed of a part of a cylindrical surface, passing and guiding the light emitted from said light source via a concave surface side of the splitting surface to said objective optical system, and splitting said signal light from the return light incident upon a convex surface side of the splitting surface by the splitting surface; and a birefringence part for further splitting the signal light split by said splitting surface into an ordinary beam and an extraordinary beam.

20. An optical device, disposed between an objective optical system for focusing a light emitted from a light source for emitting a divergent light upon an optical information storage medium to generate a return light at least partially including a signal light corresponding to stored information and for converting the return light from the optical information storage medium to a convergent light and directing the convergent light toward said light source and said light source, for passing and guiding the emitted light from said light source to said objective optical system, and for splitting the signal light from the return light reflected by said optical information storage medium and returned via said objective optical system, the optical device comprising a splitting surface constituted of a part of a cylindrical surface, the optical device passing and guiding the emitted light from said light source to said objective optical system via the concave surface side of the splitting surface, and splitting said signal light from the return light incident on the convex surface side of the splitting surface by the splitting surface, wherein the optical device further comprises: a reflecting surface formed of a part of the cylindrical surface; and a birefringence part for further splitting the signal light by said splitting surface to an ordinary beam and an extraordinary beam, which reflects the signal light split by said splitting surface on the concave surface side of said reflecting surface to converge the signal light, and further splits the signal light converged by the reflecting surface into an ordinary beam and an extraordinary beam by said birefringence part for differential outputs of two optical detectors.

* * * * *

UNITED STATES PATENT AND TRADEMARK OFFICE
CERTIFICATE OF CORRECTION

PATENT NO. : 7,065,009 B1  Page 1 of 1
APPLICATION NO. : 09/564285
DATED : June 20, 2006
INVENTOR(S) : Hasegawa et al.

It is certified that error appears in the above-identified patent and that said Letters Patent is hereby corrected as shown below:

<u>In the Claims</u>:

Col 20, line 46, delete "%".

Signed and Sealed this

Nineteenth Day of December, 2006

JON W. DUDAS
*Director of the United States Patent and Trademark Office*